(12) United States Patent  (10) Patent No.: US 11,661,166 B2
Mortland  (45) Date of Patent: May 30, 2023

(54) COAXIAL PRESSURE LOCK ASSEMBLY OF AN AIRCRAFT DOOR

(71) Applicant: The Boeing Company, Chicago, IL (US)

(72) Inventor: Michael T. Mortland, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/450,136

(22) Filed: Oct. 6, 2021

(65) Prior Publication Data

US 2022/0135201 A1    May 5, 2022

Related U.S. Application Data

(60) Provisional application No. 63/110,235, filed on Nov. 5, 2020.

(51) Int. Cl.
*B64C 1/14*    (2006.01)
*B64C 1/00*    (2006.01)

(52) U.S. Cl.
CPC ...... *B64C 1/1423* (2013.01); *B64C 2001/009* (2013.01)

(58) Field of Classification Search
CPC ............... B64C 1/1407; B64C 1/1423; B64C 2001/009
See application file for complete search history.

(56) References Cited

U.S. PATENT DOCUMENTS

| | | | | |
|---|---|---|---|---|
| 5,031,863 A | * | 7/1991 | Noble | B64C 1/1407 D12/345 |
| 5,064,147 A | * | 11/1991 | Noble | B64C 1/1407 292/DIG. 31 |
| 5,305,969 A | * | 4/1994 | Odell | B64C 1/1407 292/259 R |
| 5,337,977 A | * | 8/1994 | Fleming | B64C 1/143 D12/345 |
| 5,931,415 A | * | 8/1999 | Lingard | B64C 1/143 74/105 |
| 7,900,870 B2 | * | 3/2011 | Kyle | B64C 1/1407 244/129.4 |
| 8,047,583 B2 | * | 11/2011 | Clausen | E05B 13/00 244/129.1 |
| 8,403,265 B2 | * | 3/2013 | Gowing | B64C 1/14 244/129.5 |
| 10,189,556 B2 | * | 1/2019 | Minchau | B64C 1/1423 |
| 10,746,378 B2 | * | 8/2020 | Bachman | F21V 14/08 |
| 11,198,498 B2 | * | 12/2021 | Vergnot | B64C 1/143 |
| 2018/0319479 A1 | * | 11/2018 | Bessettes | B64C 1/143 |

* cited by examiner

*Primary Examiner* — Tye William Abell
(74) *Attorney, Agent, or Firm* — Yee & Associates, P.C.

(57) ABSTRACT

A coaxial pressure lock assembly of an aircraft door, the coaxial pressure lock assembly comprises a pressure panel positioned adjacent an opening formed in the aircraft door such that the pressure panel is seated in the opening when the pressure panel is in a closed position, and a latch shaft extending through a clevis of the pressure panel. The latch shaft is configured to rotate about a latch shaft rotational axis extending through the latch shaft. The pressure panel is rotatable between the closed position and an open position about the latch shaft rotational axis. The latch shaft is a portion of a latch assembly configured to allow or prevent unlatching the aircraft door.

20 Claims, 18 Drawing Sheets

COAXIAL PRESSURE LOCK ASSEMBLY OF AN AIRCRAFT DOOR

RELATED PROVISIONAL APPLICATION

This application claims the benefit of U.S. Provisional Patent Application Ser. No. 63/110,235 filed Nov. 5, 2020, and entitled "Coaxial Pressure Lock Assembly of an Aircraft Door" which is incorporated herein by reference in its entirety.

BACKGROUND INFORMATION

1. Field

The present disclosure relates generally to aircraft doors and more specifically to a latch assembly of an aircraft door. Yet more specifically the present disclosure relates to a pressure latch lock assembly for the aircraft door.

2. Background

A pressure lock is a mechanical device which utilizes a locking feature to prevent unlatching an aircraft door based on sensing a pressure differential between the outside air pressure and the air pressure inside the airplane. Traditional pressure locks may be undesirably large or undesirably complicated for some aircraft door designs.

Therefore, it would be desirable to have a method and apparatus that takes into account at least some of the issues discussed above, as well as other possible issues. For example, it would be desirable to provide a smaller footprint for a pressure lock.

SUMMARY

An embodiment of the present disclosure provides a coaxial pressure lock assembly of an aircraft door. The coaxial pressure lock assembly comprises a pressure panel positioned adjacent to an opening formed in the aircraft door such that the pressure panel is seated in the opening when the pressure panel is in a closed position, and a latch shaft extending through a clevis of the pressure panel. The latch shaft is configured to rotate about a latch shaft rotational axis extending through the latch shaft. The pressure panel is rotatable between the closed position and an open position about the latch shaft rotational axis. The latch shaft is a portion of a latch assembly configured to allow or prevent unlatching the aircraft door.

Another embodiment of the present disclosure provides a method of operating a coaxial pressure lock assembly of an aircraft door. A pressure panel of the aircraft door is rotated away from an opening formed in the aircraft door and about a latch shaft rotational axis extending through a latch shaft, wherein the latch shaft extends through a clevis of the pressure panel, wherein the pressure panel is configured to rotate about the latch shaft rotational axis, and wherein the latch shaft is a portion of a latch assembly configured to allow or prevent unlatching of the aircraft door. A locking pawl assembly with a connection to a beam of the aircraft door is rotated about the connection as the pressure panel rotates such that a locking sector fixed to the latch shaft is free to rotate past a restraint feature of the locking pawl assembly when the pressure panel is in an open position, wherein actuation of the latch assembly to unlatch the aircraft door is permitted when the locking sector is free to rotate past the restraint feature.

Yet another embodiment of the present disclosure provides a coaxial pressure lock assembly of an aircraft door. The coaxial pressure lock assembly comprises a pressure panel positioned adjacent an opening formed in the aircraft door such that the pressure panel is seated in the opening when the pressure panel is in a closed position, a latch shaft extending through a clevis of the pressure panel, a locking pawl assembly connected to and rotatable relative to a beam of the aircraft door, and a locking sector fixed on the latch shaft. The pressure panel comprises features to directly receive components of the coaxial pressure lock assembly, the features comprising: the clevis configured to receive the latch shaft; and a travel limit feature configured to limit rotation of the locking pawl assembly. The pressure panel is rotatable between the closed position and an open position about a latch shaft rotational axis running through the latch shaft. The locking pawl assembly is connected to and rotatable relative to a beam of the aircraft door. The locking pawl assembly comprises a pin extending through the travel limit feature of the pressure panel. The locking pawl assembly and pressure panel forms a shaft rotation restraint passage configured to maintain a locking sector within the shaft rotation restraint passage when the pressure panel is in the closed position. Actuation of a latch assembly to unlatch the aircraft door is prevented when the locking sector is maintained within the shaft rotation restraint passage.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that existing pressure locks are part of a larger mechanism that includes a venting feature. The volumetric requirements for venting cause the vent panel to be quite large. The illustrative examples recognize and take into account that due to the size of smaller doors, the large vent panel cannot be accommodated on the door. The illustrative examples recognize and take into account that a specific device for a pressure lock using a smaller panel is desired.

The illustrative examples recognize and take into account that smaller aircraft doors do not have the physical space needed to accommodate a traditional vent panel with pressure lock mechanism. The illustrative examples recognize and take into account that the pressure lock and venting functionalities may be separated. The illustrative examples of the coaxial pressure lock assembly meet the pressure locking standards. The illustrative examples of the coaxial pressure lock assembly do not provide venting functionality. The venting functionality is separated and will be provided by another independent mechanism.

The illustrative examples provide a coaxial pressure lock assembly of an aircraft door. A coaxial pressure lock mounts physically onto the latch shaft itself and can therefore directly limit unlatching motion. The coaxial pressure lock assembly comprises a pressure panel positioned adjacent an opening formed in the aircraft door such that the pressure panel is seated in the opening when the pressure panel is in a closed position, and a latch shaft extending through a clevis of the pressure panel. The latch shaft is configured to rotate about a latch shaft rotational axis extending through the latch shaft. The pressure panel is rotatable between the closed position and an open position about the latch shaft rotational axis. The latch shaft is a portion of a latch assembly configured to allow or prevent unlatching the aircraft door.

The illustrative examples recognize and take into account that ice can form on the exterior of an aircraft during flight. When a pressure panel is covered in ice, the pressure panel can be sealed in place and prevented from movement. If the pressure panel is sealed in place, the latch assembly is actuated and the pressure panel remains closed. If the pressure panel will not open, the latch shaft is prevented from rotating and the coaxial pressure lock assembly prevents the unlatching of the aircraft door. The illustrative examples recognize and take into account it would be desirable to provide an ice-breaking function in the coaxial pressure lock assembly. An ice-breaking function would break loose the pressure panel and allow it to open.

Figure 1:
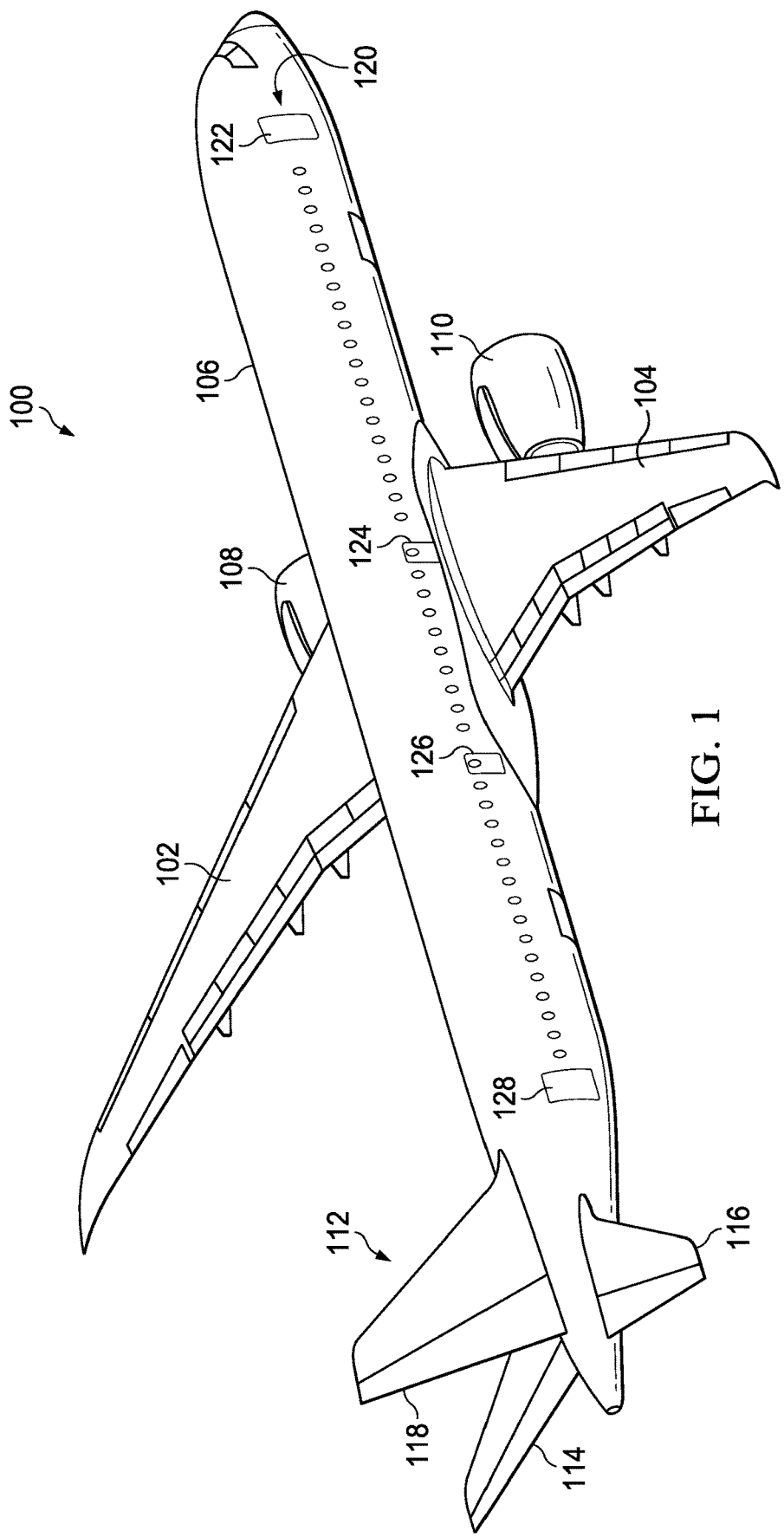
FIG. 1 is an illustration of an aircraft in which an illustrative embodiment may be implemented.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

A passenger cabin is present in body 106 of aircraft 100. Doors 120 are present in body 106 to provide access to the passenger cabin. Doors 120 include door 122, door 124, door 126, and door 128 in this example. Aircraft 100 is one illustrative example. In other illustrative examples, a design of an aircraft can have at least one of a different quantity of doors, different locations of the doors in body 106, or different designs for the doors.

The passenger cabin is part of a pressure-controlled interior in body 106 of aircraft 100. Each door of doors 120 is an aircraft door to the pressure-controlled interior. Each door of doors 120 can be described as a pressure-controlled aircraft door. Other areas in body 106, such as wheel well areas, can be non-pressure-controlled. Doors into non-pressure-controlled areas of body 106 are not pressure controlled aircraft doors.

Aircraft 100 is an example of an aircraft in which a coaxial pressure lock assembly may be implemented in accordance with an illustrative embodiment. A coaxial pressure lock assembly can be implemented in any pressure-controlled aircraft door of aircraft 100.

Figure 2:
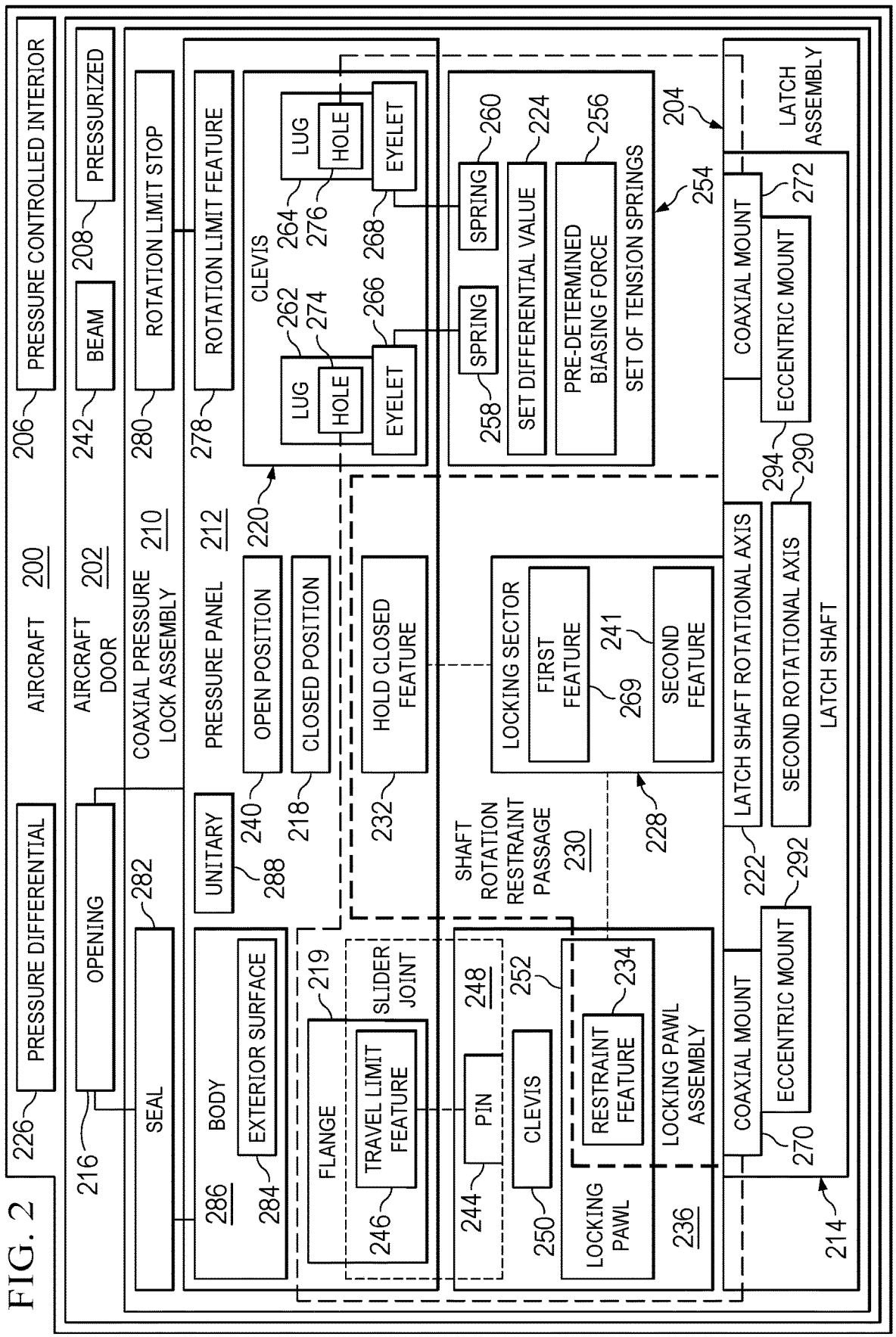
FIG. 2 is an illustration of a block diagram of an aircraft in which an illustrative embodiment may be implemented.

Turning now to FIG. 2, an illustration of a block diagram of an aircraft is depicted in which an illustrative embodiment may be implemented. Aircraft 100 is a physical embodiment of aircraft 200 of FIG. 2. Aircraft 200 has aircraft door 202 with latch assembly 204. Aircraft door 202 is a door providing access to pressure controlled interior 206 of aircraft 200. Aircraft door 202 can be described as pressure-controlled aircraft door 202.

Latch assembly 204 is actuated to latch or unlatch aircraft door 202. Actuation of latch assembly 204 can be restricted by coaxial pressure lock assembly 210.

Coaxial pressure lock assembly 210 of aircraft door 202 comprises pressure panel 212 and latch shaft 214. Pressure panel 212 is positioned adjacent opening 216 formed in aircraft door 202 such that pressure panel 212 is seated in opening 216 when pressure panel 212 is in closed position 218. Latch shaft 214 extends through clevis 220 of pressure panel 212. Latch shaft 214 is configured to rotate about latch shaft rotational axis 222 extending through latch shaft 214.

Pressure panel 212 is rotatable between closed position 218 and open position 240 about latch shaft rotational axis 222. Latch shaft 214 is a portion of latch assembly 204 configured to allow or prevent unlatching aircraft door 202.

Unlatching of aircraft door 202 can be restricted based on pressure differential 226. Pressure differential 226 is a difference between the pressure in pressure controlled interior 206 of aircraft 200 and a pressure of the environment outside of aircraft 200. When aircraft 200 is on the ground and pressure controlled interior 206 is not pressurized 208, pressure differential 226 is zero or near zero. Pressure differential 226 can be measurably greater than zero when pressure controlled interior 206 is pressurized 208. For example, when aircraft 200 is in flight, pressure controlled interior 206 is pressurized 208 and pressure differential 226 is measurably greater than zero. If the pressures inside and outside of aircraft 200 are approximately equal, pressure differential 226 is zero or near zero, and latch shaft 214 is allowed to rotate to actuate latch assembly 204.

Coaxial pressure lock assembly 210 is calibrated to set differential value 224. If the pressure inside of aircraft 200 is greater than the pressure outside of aircraft 200 by at least set differential value 224, latch shaft 214 is locked and rotation is restricted to prevent unlatching.

Locking sector 228 is fixed to latch shaft 214. Restraint of rotation of latch shaft 214 is performed by restraining locking sector 228. By restraining movement of locking sector 228, rotation of latch shaft 214 is also restrained. Latch shaft 214 is locked and rotation is restricted to prevent unlatching by restricting movement of locking sector 228.

Locking sector 228 is configured to be maintained within shaft rotation restraint passage 230 when pressure panel 212 is in closed position 218. Shaft rotation restraint passage 230 limits the movement of locking sector 228. By limiting movement of locking sector 228, rotation of latch shaft 214 is also restrained.

Shaft rotation restraint passage 230 is formed between hold closed feature 232 of pressure panel 212 and restraint feature 234 of locking pawl assembly 236 when pressure panel 212 is in closed position 218. When pressure panel 212 is in closed position 218, if an operator attempts to actuate latch assembly 204, second feature 241 of locking sector 228 engages restraint feature 234 and prevents locking sector 228 and latch shaft 214 from rotating. Locking pawl assembly 236 engages locking sector 228 on latch shaft 214 to prevent latch shaft 214 from actuating if pressure panel 212 does not release. Locking sector 228 is free to rotate past restraint feature 234 of locking pawl assembly 236 when pressure panel 212 is in open position 240.

Locking pawl assembly 236 is connected to and rotatable relative to beam 242 of aircraft door 202. Locking pawl assembly 236 rotates relative to beam 242 of aircraft door 202 as pressure panel 212 moves between open position 240 and closed position 218. Locking pawl assembly 236 is moveably connected to pressure panel 212. Locking pawl assembly 236 comprises pin 244 extending through travel limit feature 246 of pressure panel 212 to form slider joint 248. Travel limit feature 246 is configured to form slider joint 248 with locking pawl assembly 236.

Travel limit feature 246 of pressure panel 212 is configured to control and limit movement and rotation of both pressure panel 212 and locking pawl assembly 236 as pressure panel 212 moves between open position 240 and closed position 218.

In some illustrative examples, travel limit feature 246 is a slot in flange 219 of pressure panel 212. In these illustrative examples, pin 244 extends through the slot and slides within the slot as pressure panel 212 moves between open position 240 and closed position 218.

Pin 244 is connected to locking pawl assembly 236 by extending through clevis 250 of locking pawl assembly 236. In some illustrative examples, locking pawl assembly 236 is monolithic. In other illustrative examples, locking pawl assembly 236 is formed by multiple separable components joined into a unitary structure. In some illustrative examples, locking pawl assembly 236 comprises multiple components joined together by fasteners. In some illustrative examples, clevis 250 is formed by two components and locking pawl 252 positioned between the two components. In these illustrative examples, locking pawl 252 comprises restraint feature 234.

Pressure panel 212 is connected to set of tension springs 254. Set of tension springs 254 has a pre-determined biasing force 256 selected to bias the pressure panel to open position 240 at set pressure differential, set differential value 224. By having pre-determined biasing force 256, set of tension springs 254 is tunable for pressure differential detection. Set of tension springs 254 is calibrated for set differential value 224. When pressure differential 226 is below set differential value 224, pressure panel 212 is biased to open position 240 by set of tension springs 254.

As used herein, a "set of" items comprises one or more items. Thus, set of tension springs 254 can include one or more tension springs. As depicted, set of tension springs 254 includes spring 258 and spring 260.

Set of tension springs 254 is directly connected to pressure panel 212. Pressure panel 212 comprises a respective eyelet extending out from each lug of clevis 220 of pressure panel 212. Clevis 220 includes lug 262 and lug 264. Eyelet 266 extends out from lug 262. Eyelet 268 extends out from lug 264. Eyelets, eyelet 266 and eyelet 268, are configured to connect to set of tension springs 254. Each spring of set of tension springs 254 is connected to one respective eyelet. As depicted, spring 258 is connected to eyelet 266. Spring 260 is connected to eyelet 268.

Set of tension springs 254 is also connected to aircraft door 202. In some illustrative examples, set of tension springs 254 is connected to beam 242. When pressure panel 212 is moved from open position 240 to closed position 218, set of tension springs 254 is extended and put into tension.

When pressure panel 212 is moved from open position 240 to closed position 218, pressure panel 212 is held in closed position 218 by an interaction of hold closed feature 232 and first feature 269 of locking sector 228. First feature 269 is driven by latch shaft 214 and holds pressure panel 212 in closed position 218.

When pressure panel 212 moves between open position 240 and closed position 218, pressure panel 212 rotates about latch shaft rotational axis 222. Coaxial mounts, coaxial mount 270 and coaxial mount 272, enable rotation of pressure panel 212 about latch shaft rotational axis 222. Coaxial mount 270 and coaxial mount 272 each encircle a respective portion of latch shaft 214. Coaxial mount 270 and coaxial mount 272 are each rotatable around latch shaft rotational axis 222 so that pressure panel 212 rotates about latch shaft rotational axis 222.

Each coaxial mount, coaxial mount 270 and coaxial mount 272, comprises a respective cylindrical channel surrounding a respective portion of latch shaft 214. Each coaxial mount, coaxial mount 270 and coaxial mount 272, extends into a respective lug of clevis 220. As depicted, coaxial mount 270 extends into hole 274 of lug 262. As depicted, coaxial mount 272 extends into hole 276 of lug 264.

When pressure panel 212 rotates about latch shaft rotational axis 222 to closed position 218, pressure panel 212 is restricted from over rotation by rotation limit feature 278. Rotation limit feature 278 of pressure panel 212 interacts with rotation limit stop 280 of aircraft door 202. Rotation limit feature 278 stops pressure panel 212 from over rotation. When rotation limit feature 278 engages rotation limit stop 280, pressure panel 212 is seated in opening 216.

When pressure panel 212 is seated in opening 216, seal 282 engages with opening 216 of aircraft door 202. When pressure panel 212 is seated in opening 216, exterior surface 284 of pressure panel 212 forms a portion of the exterior surface of aircraft door 202. Each of rotation limit stop 280, clevis 220, eyelet 266, eyelet 268, hold closed feature 232, and travel limit feature 246 are each monolithically formed from body 286 of pressure panel 212 or directly joined to body 286 of pressure panel 212. By each feature of pressure panel 212 being either monolithically formed from body 286 of pressure panel 212 or directly joined to body 286 of pressure panel 212, pressure panel 212 is referred to as unitary 288.

When a layer of ice covers exterior surface 284 of pressure panel 212, movement of pressure panel 212 may be restrained by the ice layer. Coaxial pressure lock assembly 210 is further configured to perform limited ice-breaking operations. For example, coaxial pressure lock assembly 210 may break thin layers of ice covering exterior surface 284 of pressure panel 212. Coaxial pressure lock assembly 210 can be used to break layers of ice up to about 0.25 inches.

To perform ice-breaking operations, pressure panel 212 rotates about second rotational axis 290. Coaxial pressure lock assembly 210 further comprises eccentric mounts encircling respective portions of latch shaft 214 and creating second rotational axis 290 parallel to and offset from latch shaft rotational axis 222.

Eccentric mount 292 encircles a portion of latch shaft 214 and extends into hole 274 in lug 262 of clevis 220. In some illustrative examples, eccentric mount 292 comprises a cylindrical channel surrounding a portion of coaxial mount 270. Eccentric mount 294 encircles a portion of latch shaft 214 and extends into hole 276 in lug 264 of clevis 220. In some illustrative examples, eccentric mount 294 comprises a cylindrical channel surrounding a portion of coaxial mount 272.

The illustration of aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, set of tension springs 254 can include any desirable quantity of springs. In some illustrative examples, set of tension springs 254 is only one spring. In some illustrative examples, set of tension springs 254 includes more than two springs.

Figure 3:
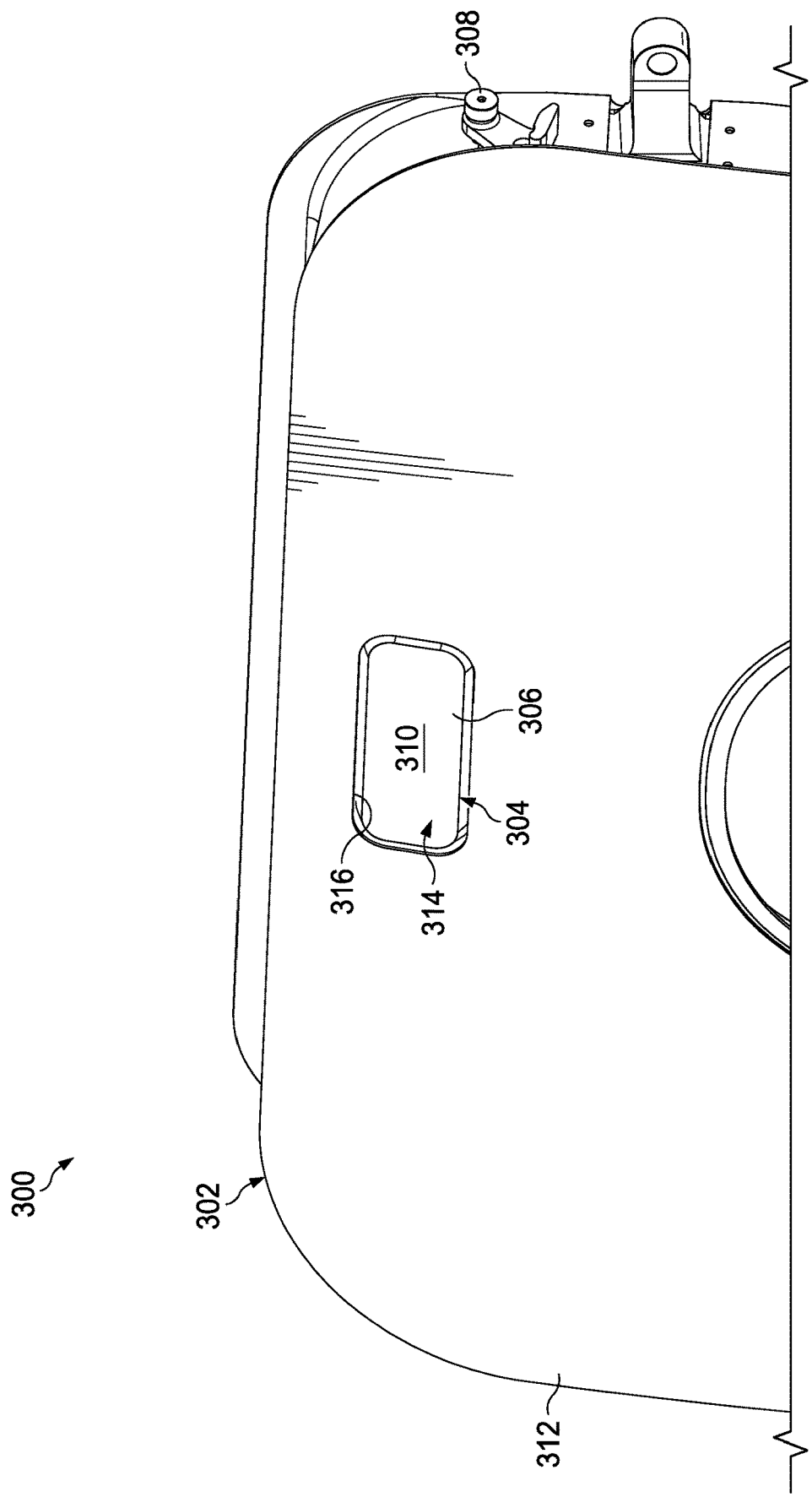
FIG. 3 is an illustration of an outside isometric view of a coaxial pressure lock assembly in an aircraft door in accordance with an illustrative embodiment.

Turning now to FIG. 3, an illustration of an outside isometric view of a coaxial pressure lock assembly in an aircraft door is depicted in accordance with an illustrative embodiment. In view 300, aircraft door 302 has coaxial pressure lock assembly 304. Aircraft door 302 is an overwing aircraft door, such as aircraft door 124 of FIG. 1. However, coaxial pressure lock assembly 304 can be implemented in any desirable pressurized door in an aircraft. Aircraft door 302 is a physical implementation of aircraft door 202 of FIG. 2. Coaxial pressure lock assembly 304 is a physical implementation of coaxial pressure lock assembly 210 of FIG. 2.

Coaxial pressure lock assembly 304 has pressure panel 306 and latch assembly 308. View 300 is referred to as an outside isometric view as exterior surface 310 of pressure panel 306 is exposed to the outside of the aircraft. Exterior surface 310 is visible outside of the aircraft. Exterior surface 310 of pressure panel 306 forms a portion of exterior surface 312 of aircraft door 302 when pressure panel 306 is in closed position 314. In closed position 314, pressure panel 306 is seated in opening 316 of aircraft door 302.

Figure 4:
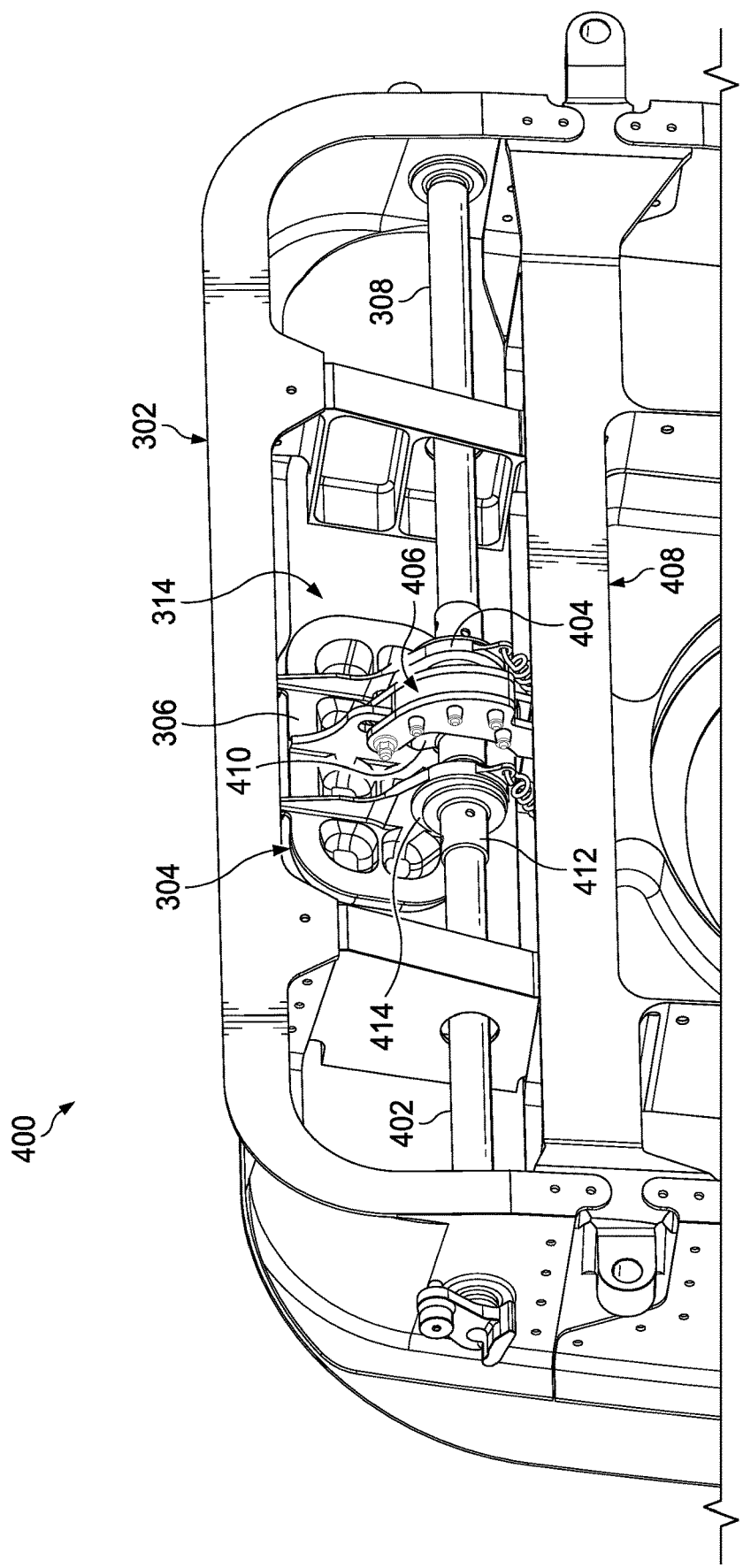
FIG. 4 is an illustration of an inside isometric view of a coaxial pressure lock assembly in an aircraft door in accordance with an illustrative embodiment.

Turning now to FIG. 4, an illustration of an inside isometric view of a coaxial pressure lock assembly in an aircraft door is depicted in accordance with an illustrative embodiment. View 400 is a view of coaxial pressure lock assembly 304 of FIG. 3 from direction 4 in FIG. 3. View 400 is referred to as an inside isometric view as components of coaxial pressure lock assembly 304 visible in view 300 will be facing the interior of the aircraft when the aircraft is operating.

In view 400, pressure panel 306 is in closed position 314. Coaxial pressure lock assembly 304 includes pressure panel 306 and latch shaft 402 extending through clevis 404 of pressure panel 306. Coaxial pressure lock assembly 304 includes pressure panel 306 and latch shaft 402 extending through clevis 404 of pressure panel 306, locking pawl assembly 406 connected to and rotatable relative to beam 408 of aircraft door 302, and locking sector 410 fixed on latch shaft 402.

In closed position 314, locking sector 410 is maintained between pressure panel 306 and locking pawl assembly 406. Restraining locking sector 410 prevents actuation of latch assembly 308. Restraining locking sector 410 restrains rotation of latch shaft 402.

Coaxial pressure lock assembly 304 further includes coaxial mount 412 and eccentric mount 414. Coaxial mount 412 enables rotation of pressure panel 306 about a latch shaft rotational axis running through latch shaft 402. Eccentric mount 414 enables rotation of pressure panel 306 about a second rotational axis offset from the latch shaft rotational axis for ice-breaking operations.

Figure 5:
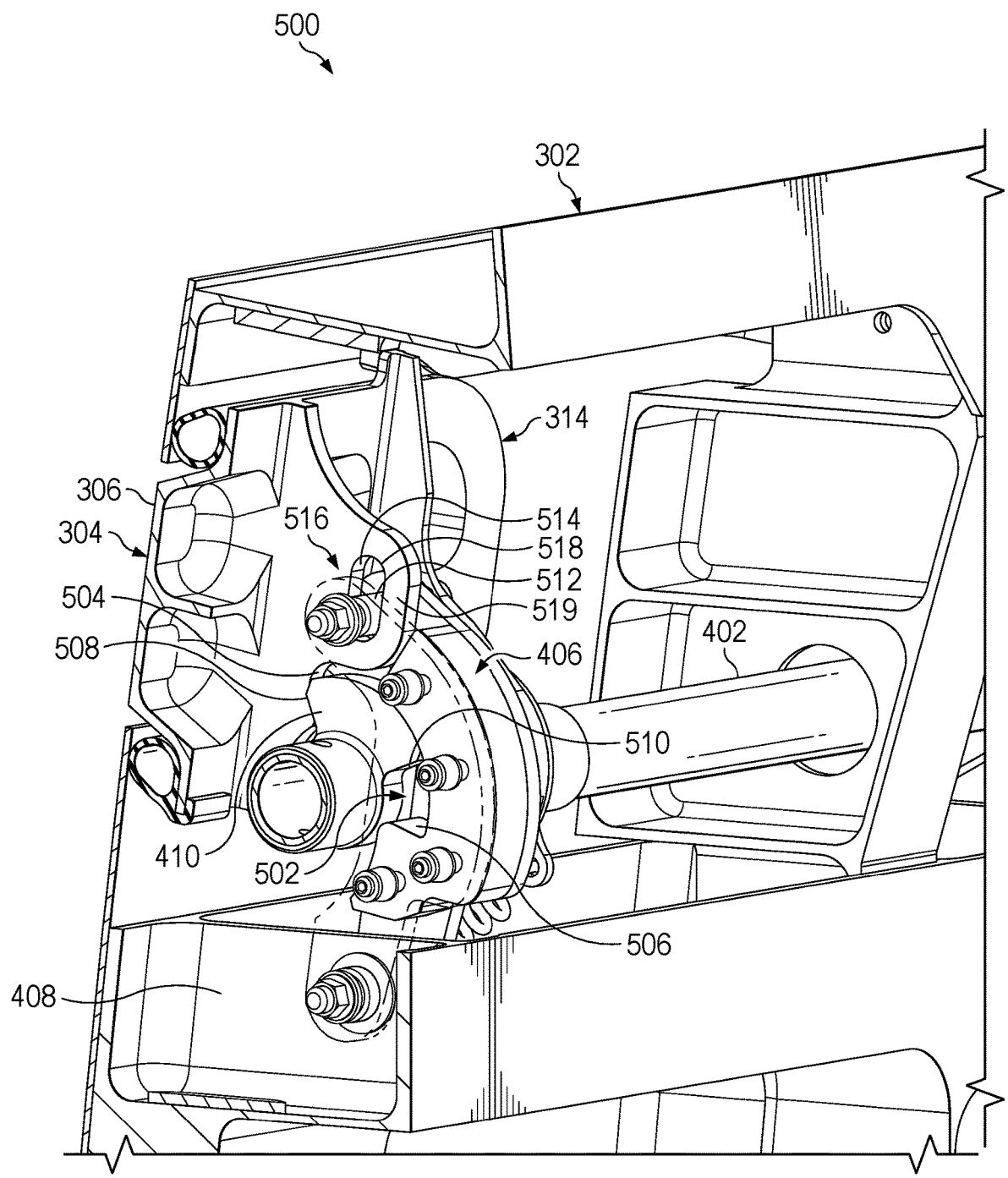
FIG. 5 is an illustration of an isometric cross-sectional view of a coaxial pressure lock assembly in an aircraft door in accordance with an illustrative embodiment.

Turning now to FIG. 5, an illustration of an isometric cross-sectional view of a coaxial pressure lock assembly in an aircraft door is depicted in accordance with an illustrative embodiment. View 500 is a cross-sectional view of aircraft door 302 and coaxial pressure lock assembly 304.

Locking pawl assembly 406 engages lock sector 410 on latch shaft 402 to prevent latch shaft 402 opening if pressure panel 306 does not release. Locking pawl assembly 406 is connected to and rotatable relative to beam 408 of the aircraft door. Locking pawl assembly 406 forms shaft rotation restraint passage 502 with pressure panel 306 when pressure panel 306 is in closed position 314.

Locking sector 410 is fixed to latch shaft 402. Locking sector 410 is configured to be maintained within shaft rotation restraint passage 502 when pressure panel 306 is in closed position 314. Locking sector 410 has a size and shape configured to be retained within shaft rotation restraint passage 502 when pressure panel 306 is in closed position 314. Shaft rotation restraint passage 502 is formed between hold closed feature 504 of pressure panel 306 and restraint feature 506 of locking pawl assembly 406 when pressure panel 306 is in closed position 314. Locking sector 410 has first feature 508 configured to engage hold closed feature 504. Locking sector 410 has second feature 510 configured to engage restraint feature 506 of locking pawl assembly 406. Locking sector 410 is free to rotate past restraint feature 506 of locking pawl assembly 406 when pressure panel 306 is in the open position (not depicted).

Locking pawl assembly 406 is connected to pressure panel 306. Locking pawl assembly 406 comprises pin 512 extending through travel limit feature 514 of pressure panel 306 to form slider joint 516. As depicted, a portion of locking pawl assembly 406 is shown in phantom such that components of slider joint 516 are more easily seen. As depicted, travel limit feature 514 takes the form of slot 518 in flange 519 introduced as flange 219 in FIG. 2). Slot 518 has a position and length configured to control the rotation of pressure panel 306 and locking pawl assembly 406. Slot 518 is configured such that pressure panel 306 and locking pawl assembly 406 do not extend an undesirable distance towards the interior of the aircraft.

Figure 6:
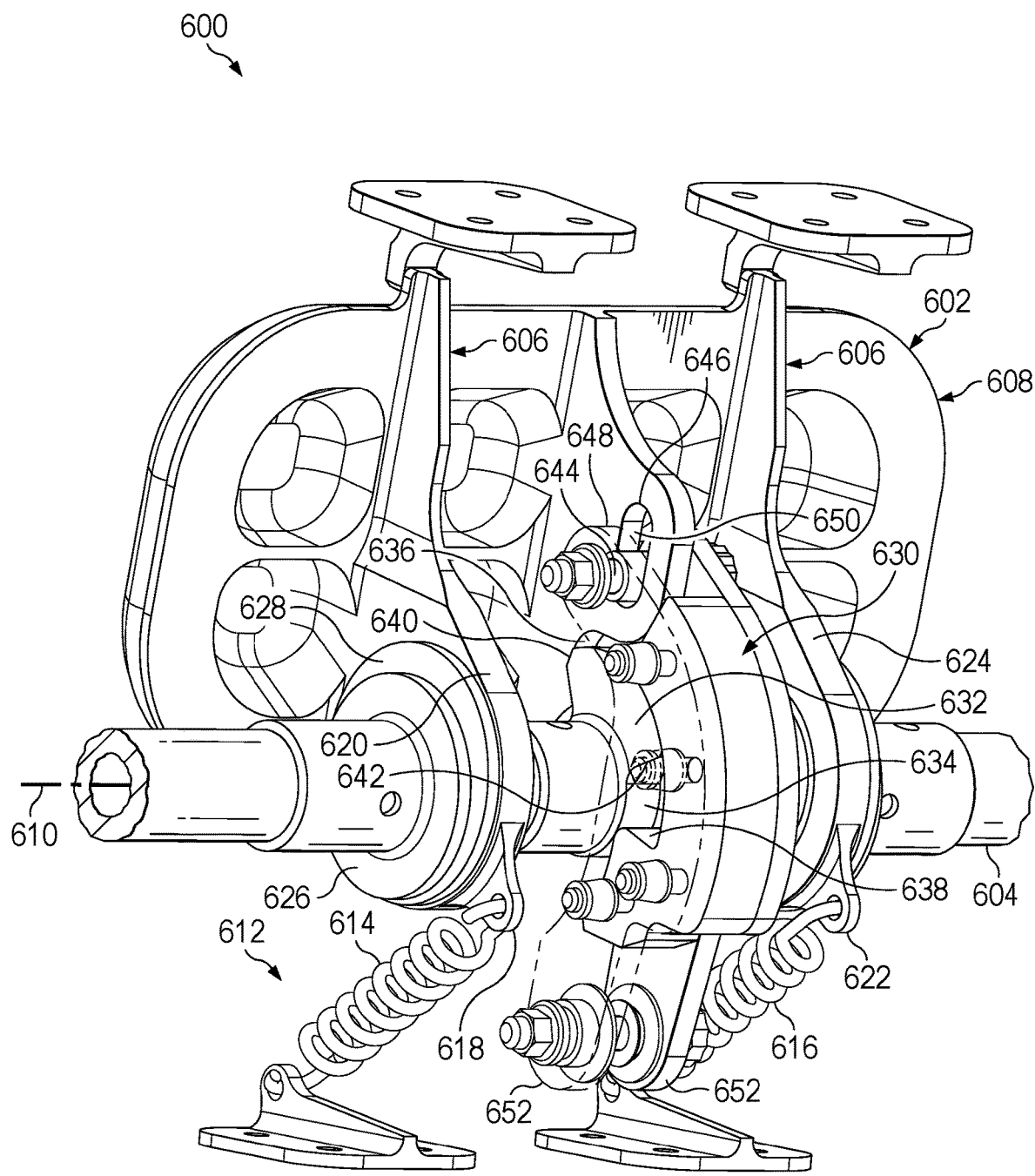
FIG. 6 is an illustration of a coaxial pressure lock assembly in accordance with an illustrative embodiment.

Turning now to FIG. 6, an illustration of a coaxial pressure lock assembly is depicted in accordance with an illustrative embodiment. Coaxial pressure lock assembly 600 is a physical implementation of coaxial pressure lock assembly 210 of FIG. 2. In some illustrative examples, coaxial pressure lock assembly 600 is the same as coaxial pressure lock assembly 304 of FIGS. 3 and 4. Coaxial pressure lock assembly 600 comprises pressure panel 602 and latch shaft 604 extending through clevis 606 of pressure panel 602.

Pressure panel 602 is rotatable between closed position 608 and an open position about latch shaft rotational axis 610 extending through latch shaft 604.

Set of tension springs 612 is connected to pressure panel 602. As depicted, set of tension springs 612 includes tension spring 614 and tension spring 616. Set of tension springs 612 has a pre-determined biasing force selected to bias pressure panel 602 to the open position at a set pressure differential.

Pressure panel 602 comprises a respective eyelet extending out from each lug of clevis 606 of pressure panel 602. Each tension spring of set of tension springs 612 is connected to one respective eyelet. Eyelet 618 extends from lug 620 of clevis 606. As depicted, tension spring 614 is connected to eyelet 618. Eyelet 622 extends from lug 624 of clevis 606. As depicted, tension spring 616 is connected to eyelet 622.

Set of tension springs 612 is configured to pull pressure panel 602 to an open position when the pressure differential between the environment outside of the aircraft and the pressure inside the pressure-controlled interior is substantially the same. Set of tension springs 612 is not strong enough to pull open pressure panel 602 when the pressure-controller interior has a greater pressure than the exterior of the aircraft.

When moving between closed position 608 and the open position, pressure panel 602 rotates about latch shaft rotational axis 610. Coaxial mount 626 encircles a portion of latch shaft 604 and enables pressure panel 602 to rotate about latch shaft rotational axis 610 extending through latch shaft 604. Eccentric mount 628 encircles a portion of latch shaft 604 and creates a second rotational axis (not depicted) parallel to and offset from latch shaft rotational axis 610. Pressure panel 602 is configured to rotate about the second rotational axis to perform an ice-breaking operation.

Coaxial mount 626 and eccentric mount 628 extend into lug 620 of clevis 606. Coaxial mount 626 comprises a cylindrical channel surrounding a portion of latch shaft 604. Eccentric mount 628 comprises a cylindrical channel surrounding a portion of coaxial mount 626.

Locking pawl assembly 630 engages lock sector 632 on latch shaft 604 to prevent latch shaft 604 opening if pressure panel 602 does not release. Locking pawl assembly 630 is connected with clevis 652 (introduced as clevis 250 in FIG. 2) to and rotatable relative to a beam (depicted as 408 in FIGS. 4 and 5) of the aircraft door. Locking pawl assembly 630 forms shaft rotation restraint passage 634 with pressure panel 602 when pressure panel 602 is in closed position 608.

Locking sector 632 is fixed to latch shaft 604. Locking sector 632 is configured to be maintained within shaft rotation restraint passage 634 when pressure panel 602 is in closed position 608. Locking sector 632 has a size and shape configured to be retained within shaft rotation restraint passage 634 when pressure panel 602 is in closed position 608. Shaft rotation restraint passage 634 is formed between hold closed feature 636 of pressure panel 602 and restraint feature 638 of locking pawl assembly 630 when pressure panel 602 is in closed position 608. Locking sector 632 has first feature 640 configured to engage hold closed feature 636. Locking sector 632 has second feature 642 configured to engage restraint feature 638 of locking pawl assembly 630. Locking sector 632 is free to rotate past restraint feature 638 of locking pawl assembly 630 when pressure panel 602 is in the open position (not depicted).

Locking pawl assembly 630 is connected to pressure panel 602. Locking pawl assembly 630 comprises pin 644 extending through travel limit feature 646 of pressure panel 602 to form slider joint 648. As depicted, travel limit feature 646 takes the form of slot 650. Slot 650 has a position and length configured to control the rotation of pressure panel 602 and locking pawl assembly 630. Slot 650 is configured such that pressure panel 602 and locking pawl assembly 630 do not extend an undesirable distance towards the interior of the aircraft.

Figure 7:
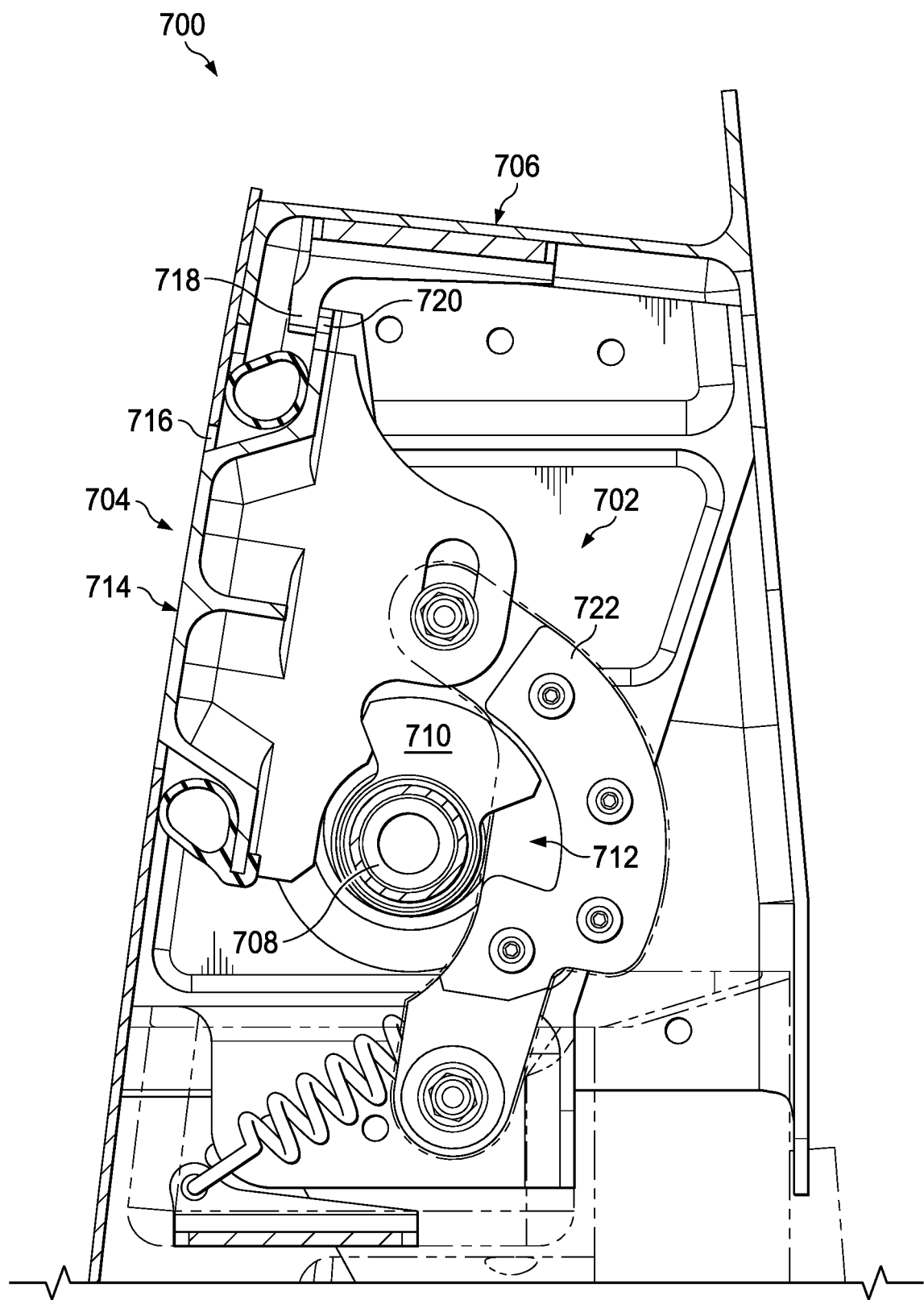
FIG. 7 is an illustration of a side cross-sectional view of a coaxial pressure lock assembly in a closed position in an aircraft door in accordance with an illustrative embodiment.

Turning now to FIG. 7, an illustration of a side cross-sectional view of a coaxial pressure lock assembly in a closed position in an aircraft door is depicted in accordance with an illustrative embodiment. View 700 is a side-cross-sectional view of coaxial pressure lock assembly 702 in closed position 704 in aircraft door 706. Coaxial pressure lock assembly 702 is a physical implementation of coaxial pressure lock assembly 210 of FIG. 2. In some illustrative examples, coaxial pressure lock assembly 702 is the same as coaxial pressure lock assembly 304 of FIGS. 3-5. In some illustrative examples, coaxial pressure lock assembly 702 is a physical implementation of coaxial pressure lock assembly 600 of FIG. 6.

In view 700, latch shaft 708 is shown at 0° rotation. Lock sector 710 is retained within shaft rotation restraint passage 712. Lock sector 710 holds pressure panel 714 in closed position 704. In closed position 704 pressure panel 714 is seated in opening 716 of aircraft door 706.

Pressure panel 714 is held closed against rotation limit stop 718. Rotation limit stop 718 is a mechanical travel stop that interacts with rotation limit feature 720 of pressure panel 714.

Locking pawl assembly 722 is in a 'locked' position. Locking pawl assembly 722 is in a 'locked' position to prevent full motion of latch shaft 708.

Figure 8:
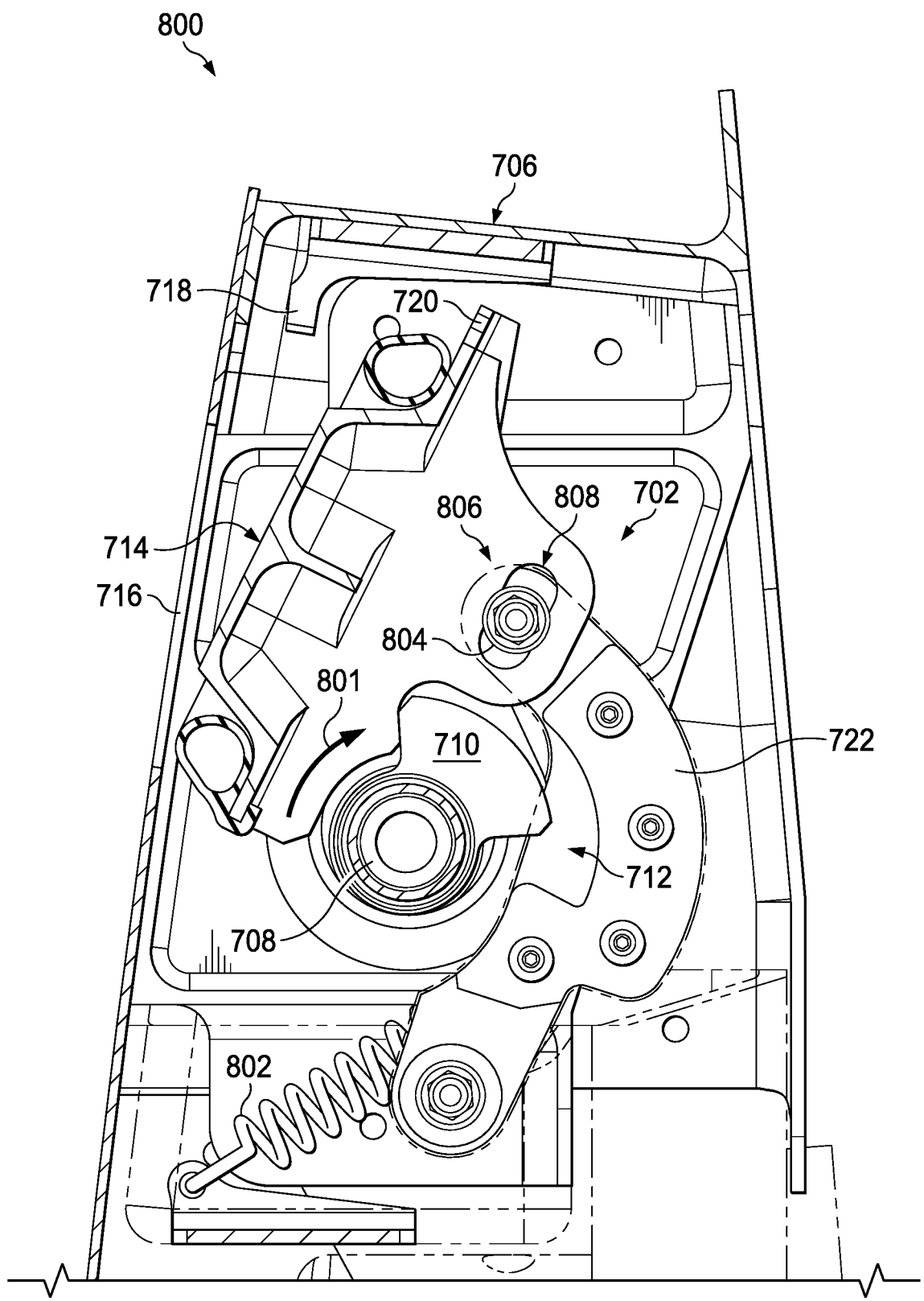
FIG. 8 is an illustration of a side cross-sectional view of a coaxial pressure lock assembly in an intermediate position in an aircraft door in accordance with an illustrative embodiment.

Turning now to FIG. 8, an illustration of a side cross-sectional view of a coaxial pressure lock assembly in an intermediate position in an aircraft door is depicted in accordance with an illustrative embodiment. View 800 is a view of coaxial pressure lock assembly 702 operating under pressure differential conditions desirable for unlatching the aircraft door. View 800 is a view of coaxial pressure lock assembly 702 operating under a zero or near-zero pressure differential. View 800 is a view of coaxial pressure lock assembly 702 in an opening condition. View 800 is a view of a transitional position of coaxial pressure lock assembly 702 in moving from closed position 704 to an open position. View 800 can be described as a mid-travel panel opening position.

In view 800, latch shaft 708 has been rotated in direction 801 from view 700. Between view 700 and 800 locking sector 710 has rotated in direction 801. Locking sector 710 restrains movement of pressure panel 714 during opening. Set of tension springs 802 pulls pressure panel 714 open. Set of tension springs 802 keeps pressure panel 714 riding against locking sector 710.

Locking pawl assembly 722 moves toward an open/unlocked position as pressure panel 714 opens. Between view 700 and view 800, pin 804 of locking pawl assembly 722 has moved within slider joint 806 formed by pin 804 and travel limit feature 808 of pressure panel 714.

Figure 9:
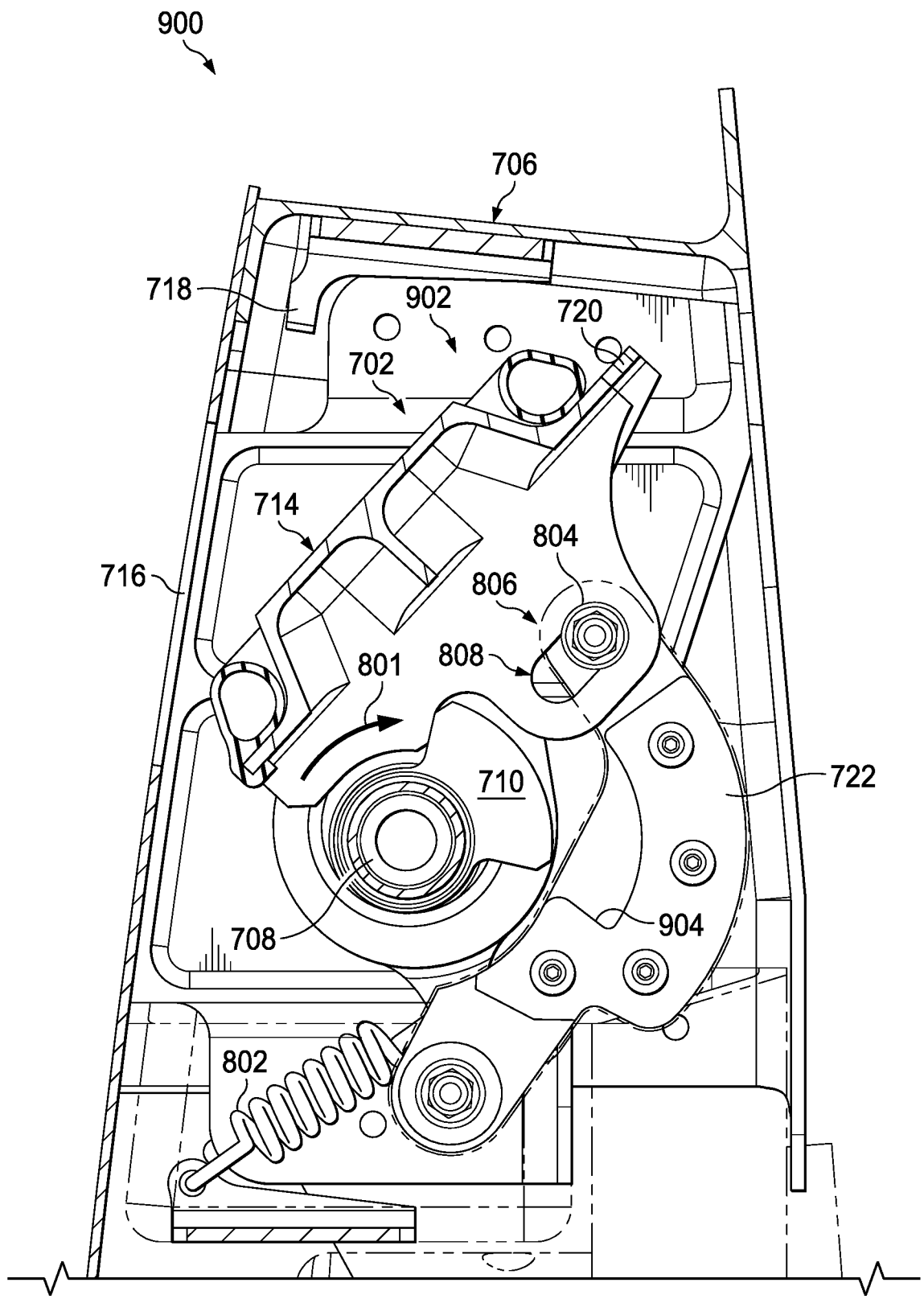
FIG. 9 is an illustration of a side cross-sectional view of a coaxial pressure lock assembly in an open position in an aircraft door in accordance with an illustrative embodiment.

Turning now to FIG. 9, an illustration of a side cross-sectional view of a coaxial pressure lock assembly in an open position in an aircraft door is depicted in accordance with an illustrative embodiment. View 900 is a view of coaxial pressure lock assembly 702 in open position 902. View 900 is a view of coaxial pressure lock assembly 702 operating under pressure differential conditions desirable for unlatching the aircraft door. View 900 is a view of coaxial pressure lock assembly 702 operating under a zero or near-zero pressure differential.

In view 900, latch shaft 708 has been further rotated in direction 801 from view 800. Between view 800 and 900 locking sector 710 has rotated in direction 801. In open position 902 shaft rotation restraint passage 712 is no longer present. Latch shaft 708 is free to continue rotation when pressure panel 714 is in open position 902. In view 900 locking sector 710 is free to rotate past restraint feature 904 of locking pawl assembly 722.

Pressure panel 714 is held in open position 902 by set of tension springs 802. In view 900, locking sector 710 starts to gap to pressure panel 714 contact. In view 900, locking pawl assembly 722 is at full open/unlocked position.

Between view 800 and view 900, pin 804 of locking pawl assembly 722 has moved within slider joint 806 to an end of slider joint 806. Locking pawl assembly 722 is at a maximum travel position in slider joint 806.

Figure 10:
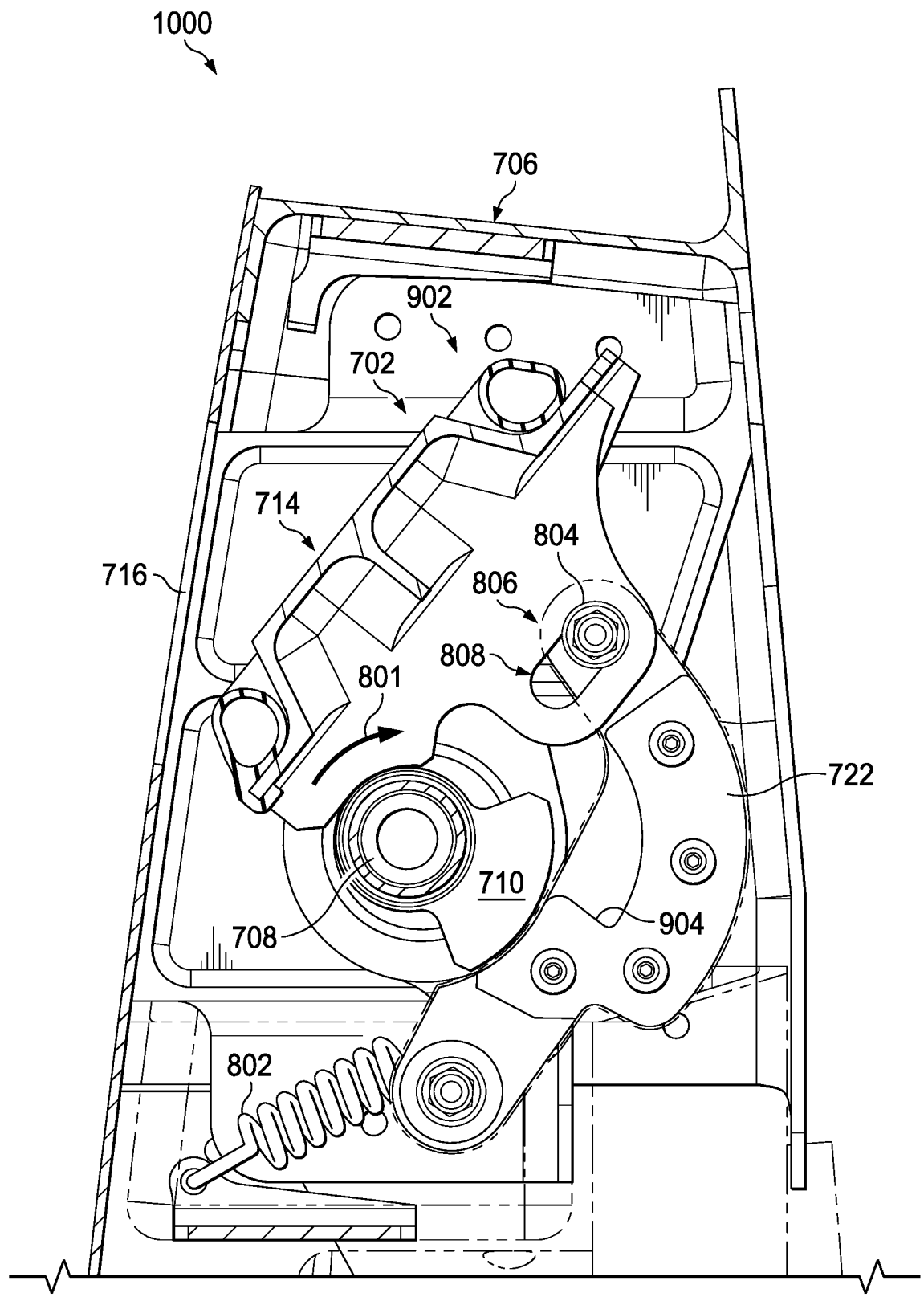
FIG. 10 is an illustration of a side cross-sectional view of a lock sector rotating past a closed feature in a coaxial pressure lock assembly in an open position in an aircraft door in accordance with an illustrative embodiment.

Turning now to FIG. 10, an illustration of a side cross-sectional view of a lock sector rotating past a closed feature in a coaxial pressure lock assembly in an open position in an aircraft door is depicted in accordance with an illustrative embodiment. View 1000 is a view of coaxial pressure lock assembly 702 operating under pressure differential conditions desirable for unlatching the aircraft door. View 1000 is a view of coaxial pressure lock assembly 702 operating under a zero or near-zero pressure differential.

View 1000 is a view of coaxial pressure lock assembly 702 in open position 902 with locking sector 710 continuing to rotate in direction 801. In view 1000, locking sector 710 is moving past restraint feature 904 of locking pawl assembly 722. Rotating locking sector 710 and latch shaft 708 actuates the latch assembly of aircraft door 706.

Pressure panel 714 is held in open position 902 by set of tension springs 802. In view 1000, locking sector 710 further gaps to pressure panel 714 contact. In view 1000, locking pawl assembly 722 is at a full open/unlocked position.

Figure 11:
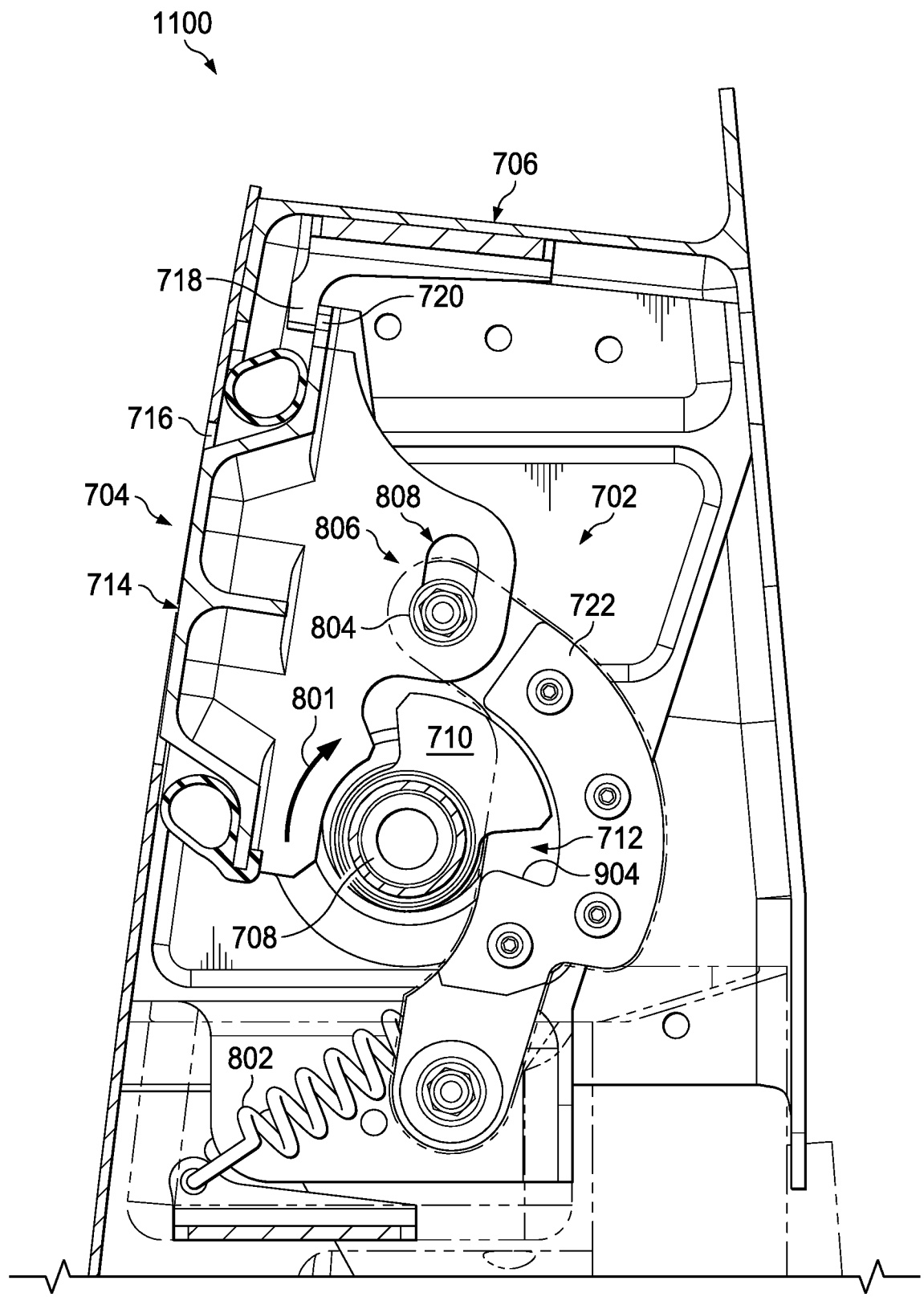
FIG. 11 is an illustration of a side cross-sectional view of a coaxial pressure lock assembly in a closed position in an aircraft door in accordance with an illustrative embodiment.

Turning now to FIG. 11, an illustration of a side cross-sectional view of a coaxial pressure lock assembly in a closed position in an aircraft door is depicted in accordance with an illustrative embodiment. View 1100 is a side-cross-sectional view of coaxial pressure lock assembly 702 in closed position 704 in aircraft door 706. In closed position 704 pressure panel 714 is seated in opening 716 of aircraft door 706.

View 1100 is a view of coaxial pressure lock assembly 702 operating under a non-zero pressure differential condition. View 1100 is a view of coaxial pressure lock assembly 702 operating when the aircraft interior is pressurized to a pressure greater than the exterior conditions.

In view 1100, latch shaft 708 and locking sector 710 have rotated in direction 801. Lock sector 710 is retained within shaft rotation restraint passage 712.

Locking pawl assembly 722 is in a 'locked' position. Locking pawl assembly 722 is in a 'locked' position to prevent full motion of latch shaft 708.

Figure 12:
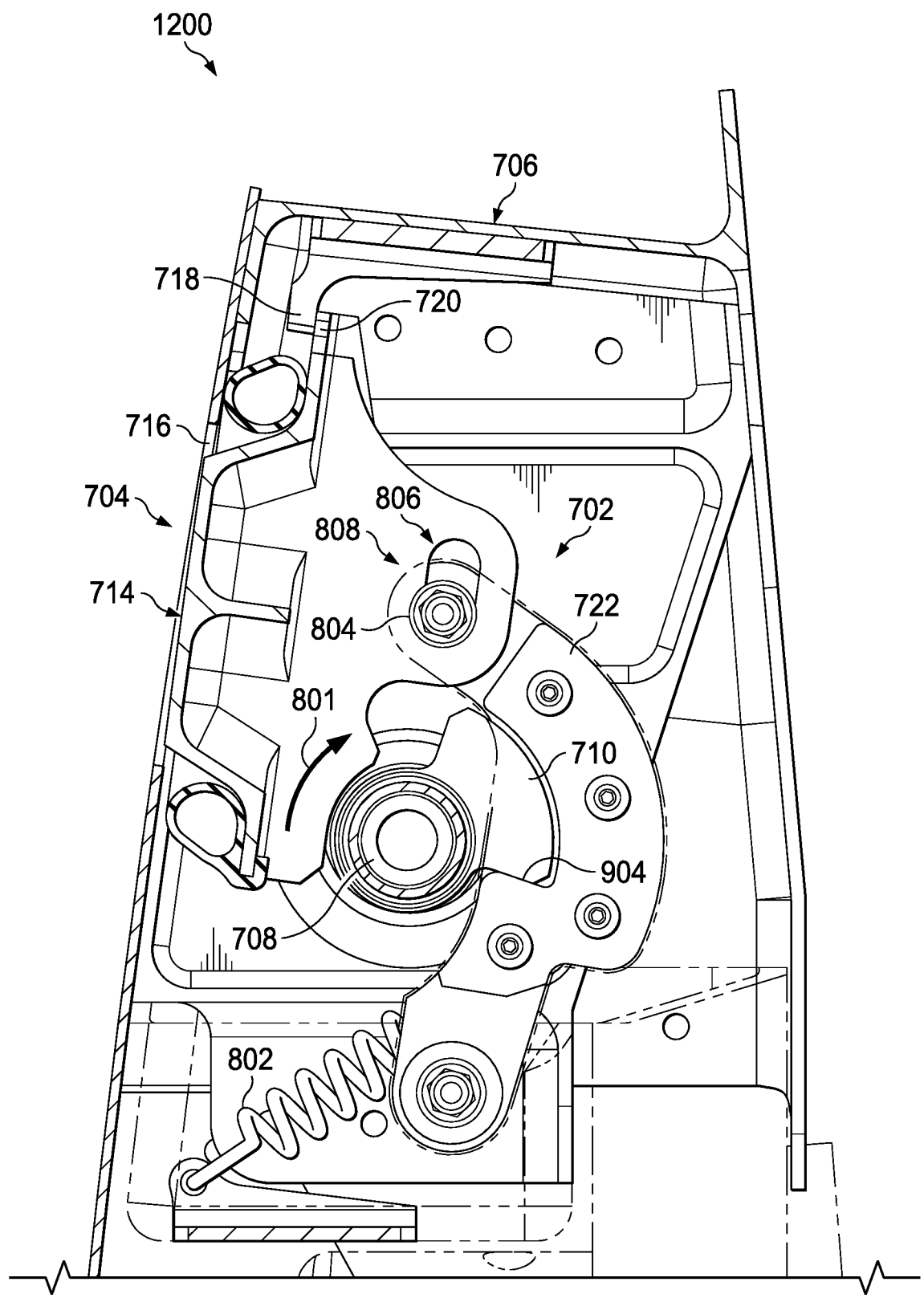
FIG. 12 is an illustration of a side cross-sectional view of a coaxial pressure lock assembly in a closed position in an aircraft door in accordance with an illustrative embodiment.

Turning now to FIG. 12, an illustration of a side cross-sectional view of a coaxial pressure lock assembly in a closed position in an aircraft door is depicted in accordance with an illustrative embodiment. View 1200 is a side-cross-sectional view of coaxial pressure lock assembly 702 in closed position 704 in aircraft door 706. In closed position 704 pressure panel 714 is seated in opening 716 of aircraft door 706.

View 1200 is a view of coaxial pressure lock assembly 702 operating under a non-zero pressure differential condition. View 1200 is a view of coaxial pressure lock assembly 702 operating when the aircraft interior is pressurized to a pressure greater than the exterior conditions.

In view 1200, latch shaft 708 and locking sector 710 have rotated in direction 801 from view 1100. Lock sector 710 is retained within shaft rotation restraint passage 712.

Locking pawl assembly 722 is in a 'locked' position. Locking pawl assembly 722 is in a 'locked' position to prevent full motion of latch shaft 708.

Figure 13:
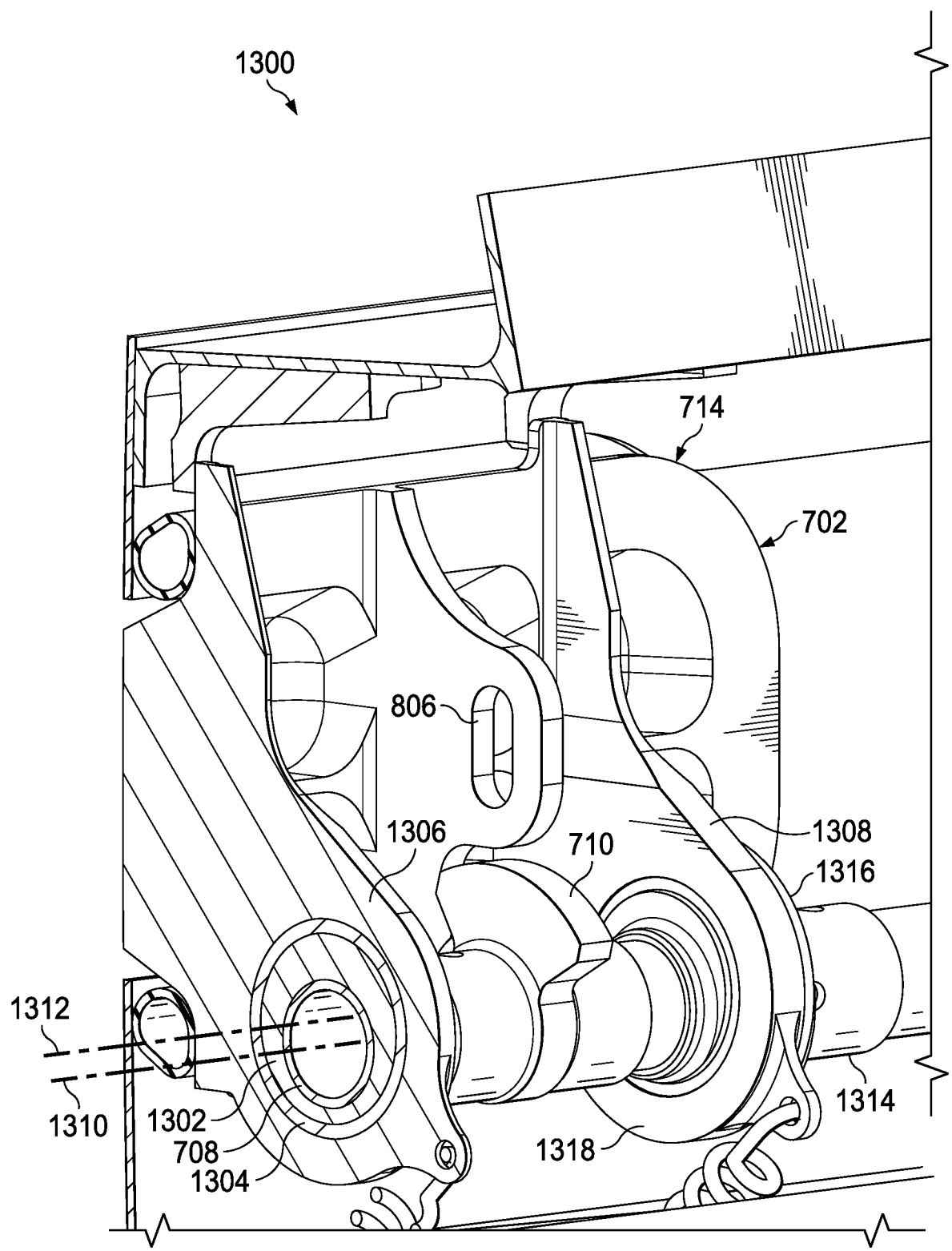
FIG. 13 is an illustration of a partially assembled coaxial pressure lock assembly in an aircraft door in accordance with an illustrative embodiment.

Turning now to FIG. 13, an illustration of a partially assembled coaxial pressure lock assembly in an aircraft door is depicted in accordance with an illustrative embodiment. View 1300 is a cross-sectional view of components of coaxial pressure lock assembly 702. View 1300 is a cross-sectional view through coaxial mount 1302 and eccentric mount 1304. View 1300 is a cross-sectional view through lug 1306 of clevis 1308 of pressure panel 714.

Coaxial mount 1302 encircles a portion of latch shaft 708 and is rotatable around the latch shaft rotational axis 1310. Latch shaft rotational axis 1310 extends through latch shaft 708. Pressure panel 714 rotates about latch shaft rotational axis 1310 due to coaxial mount 1302. Portions of coaxial mount 1302 extend into lug 1306 of clevis 1308.

Eccentric mount 1304 also extends into lug 1306 of clevis 1308. Eccentric mount 1304 encircles a portion of latch shaft 708 and creates second rotational axis 1312 parallel to and offset from latch shaft rotational axis 1310. Pressure panel 714 is configured to rotate about second rotational axis 1312. To perform an ice-breaking operation, pressure panel 714 is rotated about second rotational axis 1312.

As depicted, coaxial pressure lock assembly 702 also has coaxial mount 1314 and eccentric mount 1316 encircling latch shaft 708. Coaxial mount 1314 and eccentric mount 1316 extend into lug 1318 of clevis 1308.

Figure 14:
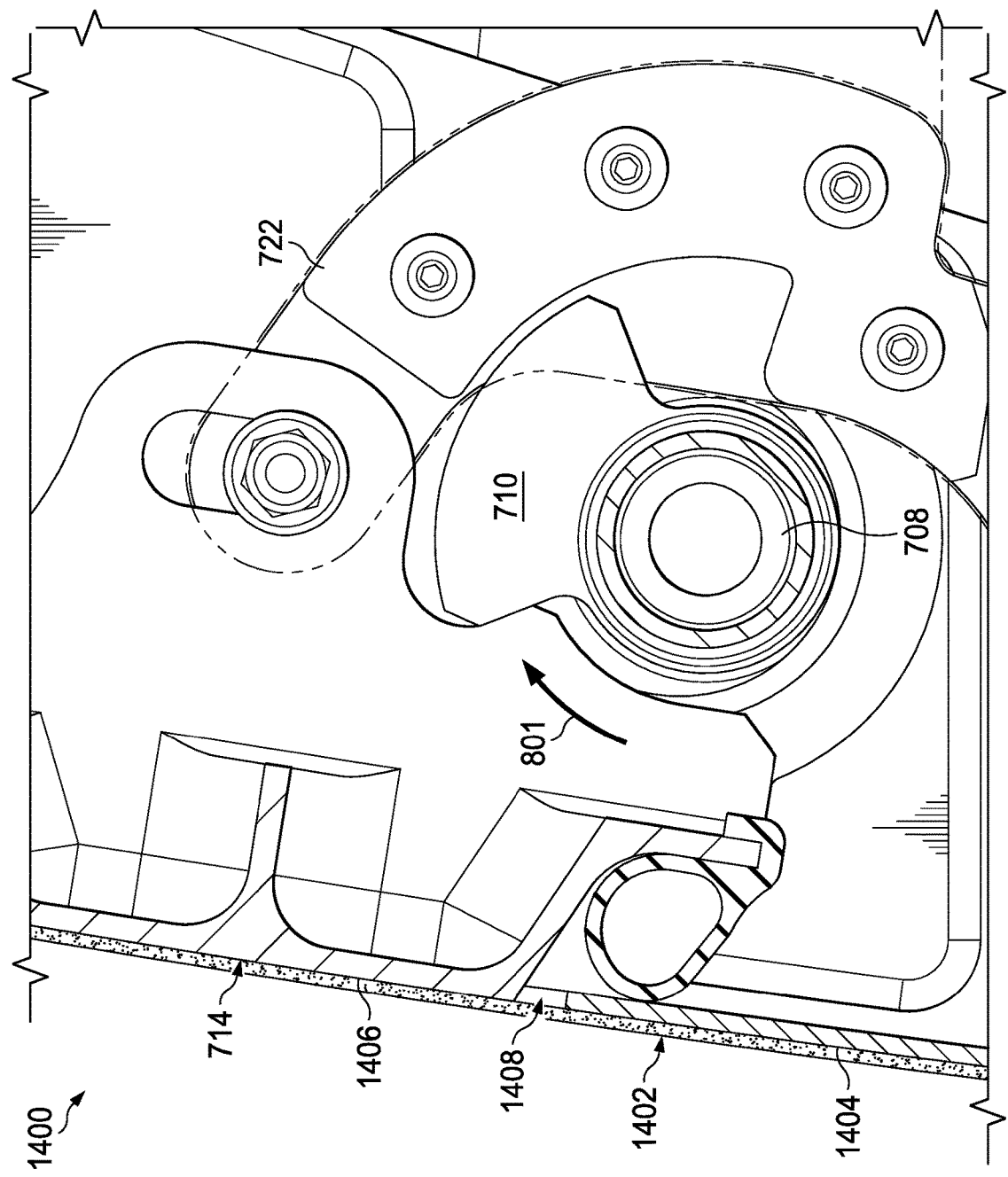
FIG. 14 is an illustration of a side cross-sectional view of a coaxial pressure lock assembly in a closed position in an aircraft door in accordance with an illustrative embodiment.

Turning now to FIG. 14, an illustration of a side cross-sectional view of a coaxial pressure lock assembly in a closed position in an aircraft door is depicted in accordance with an illustrative embodiment. In view 1400, pressure panel 714 is in closed position 704. In view 1400, the pressure differential is zero or near zero. Ice layer 1402 on exterior surface 1404 of aircraft door 706 and exterior surface 1406 of pressure panel 714 restrains movement of pressure panel 714.

Gap 1408 is present between exterior surface 1404 of aircraft door 706 and exterior surface 1406 of pressure panel 714. In view 1400, ice layer 1402 bridges gap 1408 between exterior surface 1404 of aircraft door 706 and exterior surface 1406 of pressure panel 714.

Figure 15:
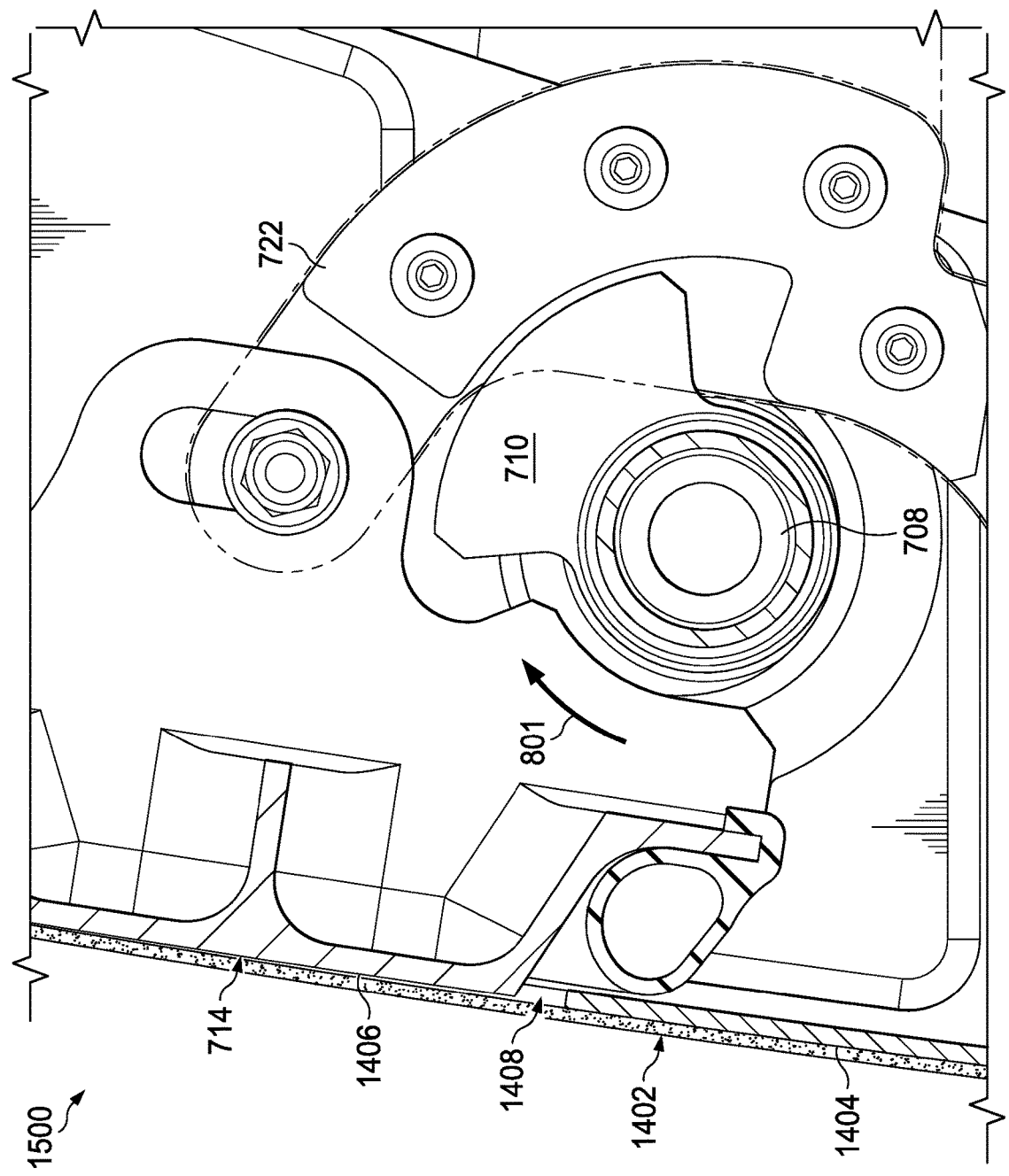
FIG. 15 is an illustration of a side cross-sectional view of a coaxial pressure lock assembly in an aircraft door during an ice-breaking operation in accordance with an illustrative embodiment.

Turning now to FIG. 15, an illustration of a side cross-sectional view of a coaxial pressure lock assembly in an aircraft door during an ice-breaking operation is depicted in accordance with an illustrative embodiment. In view 1500, latch shaft 708 is rotated in direction 801 to perform an ice-breaking operation. To perform an ice-breaking operation, pressure panel 714 is rotated around a second rotational axis, such as second rotational axis 1312 of FIG. 13 created by an eccentric mount, such as eccentric mount 1304 of FIG. 13.

Figure 16:
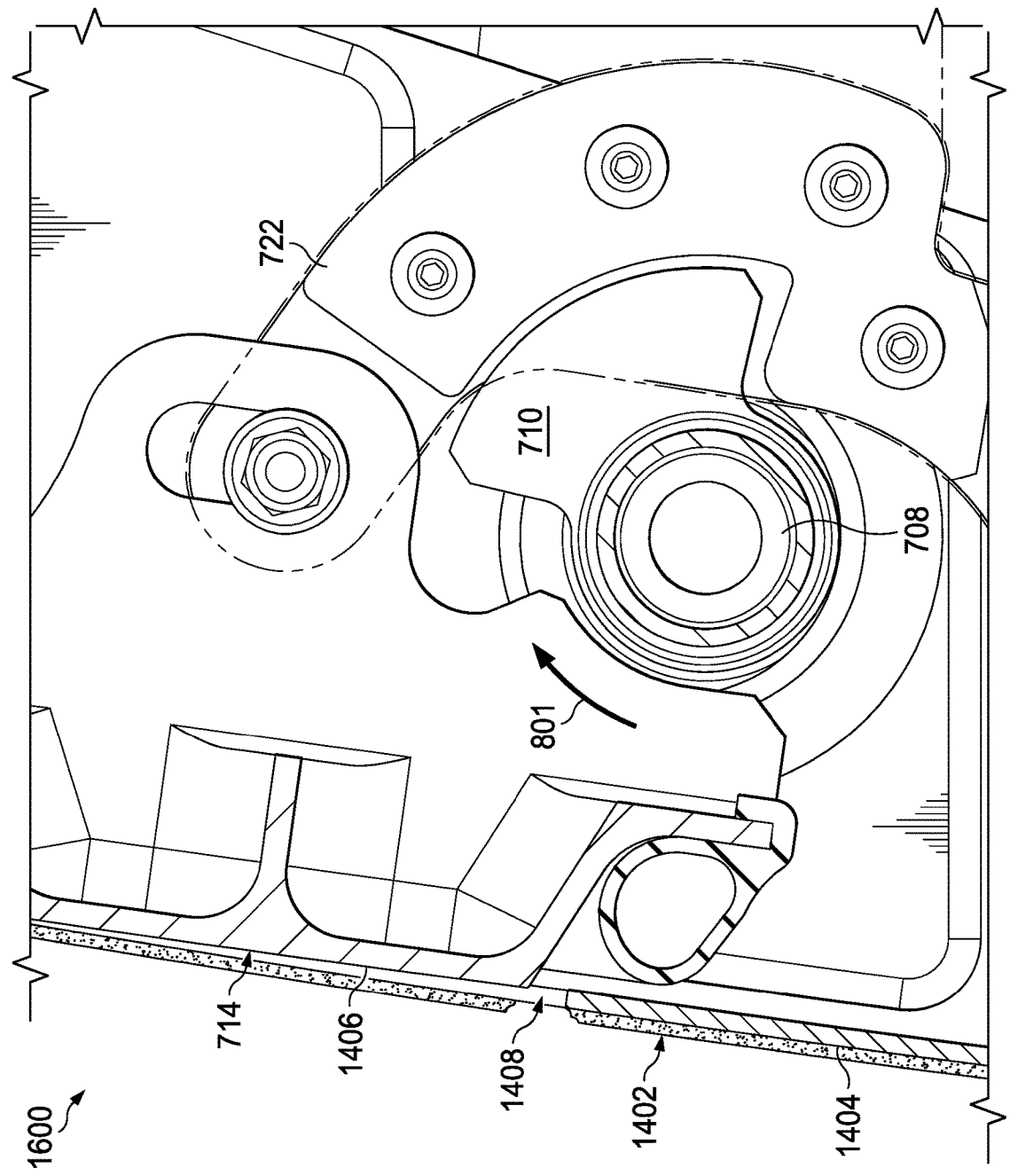
FIG. 16 is an illustration of a side cross-sectional view of a coaxial pressure lock assembly in an aircraft door during an ice-breaking operation in accordance with an illustrative embodiment.

Turning now to FIG. 16, an illustration of a side cross-sectional view of a coaxial pressure lock assembly in an aircraft door during an ice-breaking operation is depicted in accordance with an illustrative embodiment. In view 1600, latch shaft 708 has continued to rotate in direction 801. By rotating latch shaft 708, pressure panel 714 has been rotated about the second rotational axis and pulled away from opening 716 in aircraft door 706. Pulling pressure panel 714 away from opening 716 causes a shearing force in ice layer 1402 which will cause ice layer 1402 to break and free pressure panel 714 from ice layer 1402.

In view 1600, ice layer 1402 has been broken at gap 1408. Ice layer 1402 no longer bridges exterior surface 1404 of aircraft door 706 and exterior surface 1406 of pressure panel 714 in view 1600. In view 1600, the shearing force in ice layer 1402 broke ice layer 1402 over gap 1408. In view 1600, ice layer 1402 does not restrain movement of pressure panel 714. Pressure panel 714 is able to operate to allow the latch assembly to unlatch aircraft door 706.

Figure 17:
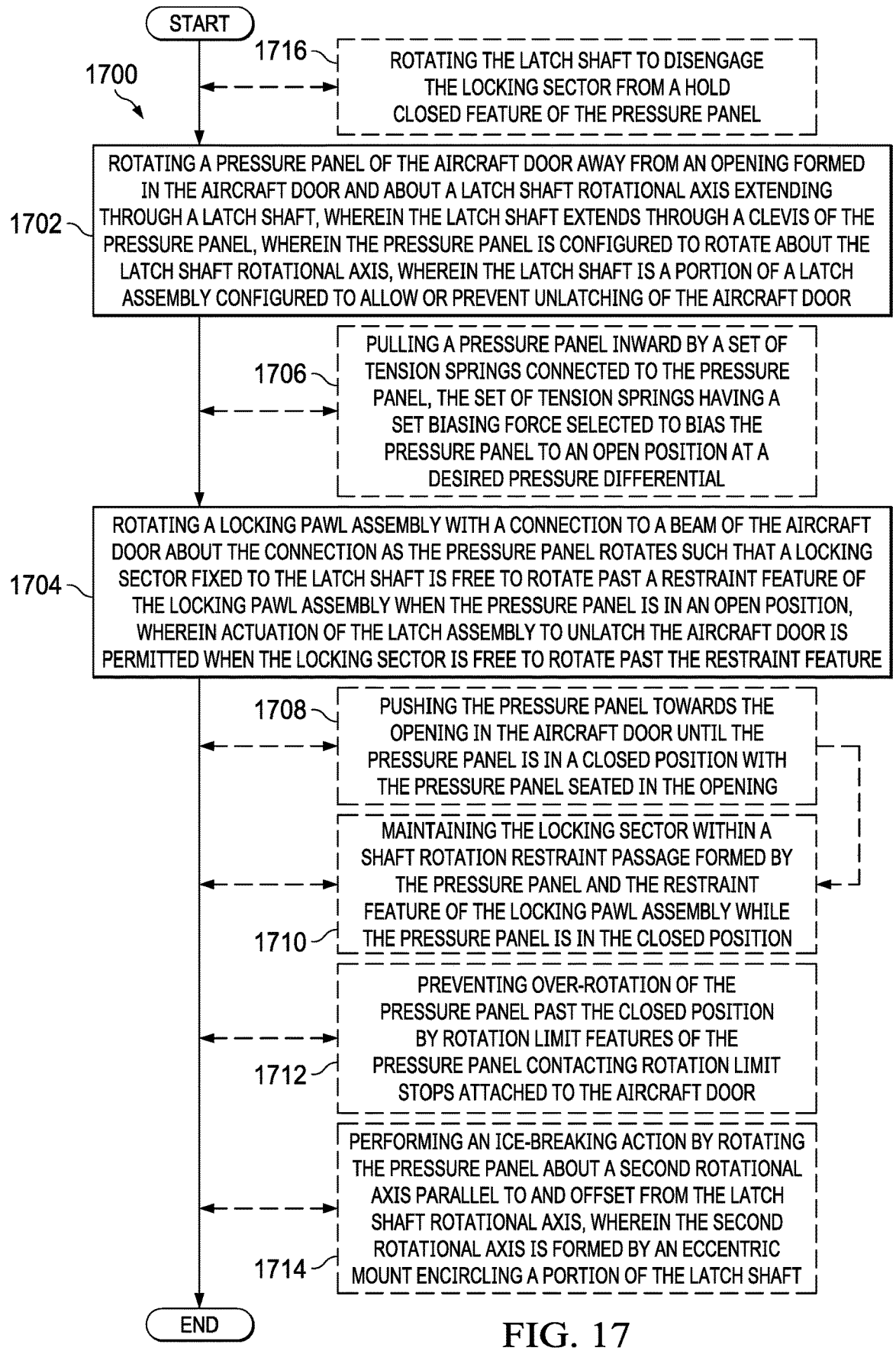
FIG. 17 is an illustration of a flowchart of a method of operating a coaxial pressure lock assembly in accordance with an illustrative embodiment.

Turning now to FIG. 17, an illustration of a flowchart of a method of operating a coaxial pressure lock assembly is depicted in accordance with an illustrative embodiment. Method 1700 can be used to operate a coaxial pressure lock assembly in aircraft 100 of FIG. 1. Method 1700 can be used to operate a coaxial pressure lock assembly 210 in aircraft 200 of FIG. 2. Method 1700 can be used to operate a coaxial pressure lock assembly 304 in FIGS. 3-5. Method 1700 can be used to operate a coaxial pressure lock assembly 600 in FIG. 6. Method 1700 can be used to operate a coaxial pressure lock assembly 702 in FIGS. 7-16.

Method 1700 rotates a pressure panel of the aircraft door away from an opening formed in the aircraft door and about a latch shaft rotational axis extending through a latch shaft, wherein the latch shaft extends through a clevis of the pressure panel, wherein the pressure panel is configured to rotate about the latch shaft rotational axis, wherein the latch shaft is a portion of a latch assembly configured to allow or prevent unlatching of the aircraft door (operation 1702). Method 1700 rotates a locking pawl assembly with a connection to a beam of the aircraft door about the connection as the pressure panel rotates such that a locking sector fixed to the latch shaft is free to rotate past a restraint feature of the locking pawl assembly when the pressure panel is in an open position, wherein actuation of the latch assembly to unlatch the aircraft door is permitted when the locking sector is free to rotate past the restraint feature (operation 1704). Afterwards, method 1700 terminates.

In some illustrative examples, method 1700 further comprises pulling a pressure panel inward by a set of tension springs connected to the pressure panel, the set of tension springs having a set biasing force selected to bias the pressure panel to an open position at a set pressure differential (operation 1706). In these illustrative examples, the set of tension springs is selected for pressure differential detection. In these illustrative examples, rotation of the pressure panel in operation 1704 can be started by rotation of the latch shaft and continued by the pulling by the set of tension springs.

In some illustrative examples, method 1700 further comprises pushing the pressure panel towards the opening in the aircraft door until the pressure panel is in a closed position with the pressure panel seated in the opening (operation 1708). In some illustrative examples, method 1700 further comprises maintaining the locking sector within a shaft rotation restraint passage formed by the pressure panel and the restraint feature of the locking pawl assembly while the pressure panel is in the closed position (operation 1710).

Method 1700 further comprises preventing over-rotation of the pressure panel past the closed position by rotation limit features of the pressure panel contacting rotation limit stops attached to the aircraft door (operation 1712). In this illustrative example, the rotation limit features and rotation limit stops act as mechanical over-rotation prevention.

In some illustrative examples, method 1700 further comprises performing an ice-breaking action by rotating the pressure panel about a second rotational axis parallel to and offset from the latch shaft rotational axis, wherein the second rotational axis is formed by an eccentric mount encircling a portion of the latch shaft (operation 1714). By rotating the pressure panel about the second rotational axis, the pressure panel is pulled away from the opening in the aircraft door, causing a shearing action in the ice layer. By rotating the pressure panel about the second rotational axis, the shearing action can be present in the ice layer where the ice layer bridges the gap between the exterior surface of the pressure panel and the exterior surface of the aircraft door. The shearing action in the ice layer causes the ice layer to break and frees the pressure panel from the ice layer. This ice-breaking operation can be performed on relatively thin ice layers. In some illustrative examples, the ice-breaking operation can be performed on ice layers up to about a quarter of an inch.

In some illustrative examples, method 1700 rotates the latch shaft to disengage the locking sector from a hold closed feature of the pressure panel (operation 1716). Prior to rotating the pressure panel, the hold closed feature of the pressure panel is released. To release the hold closed feature, the latch shaft is rotated. Rotating the latch shaft disengages the locking sector from the hold closed feature. After disengaging the locking sector from the hold closed feature, the pressure panel is free to rotate, such as in performing operation 1702 or operation 1714.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1706 through operation 1716 may be optional.

Figure 18:
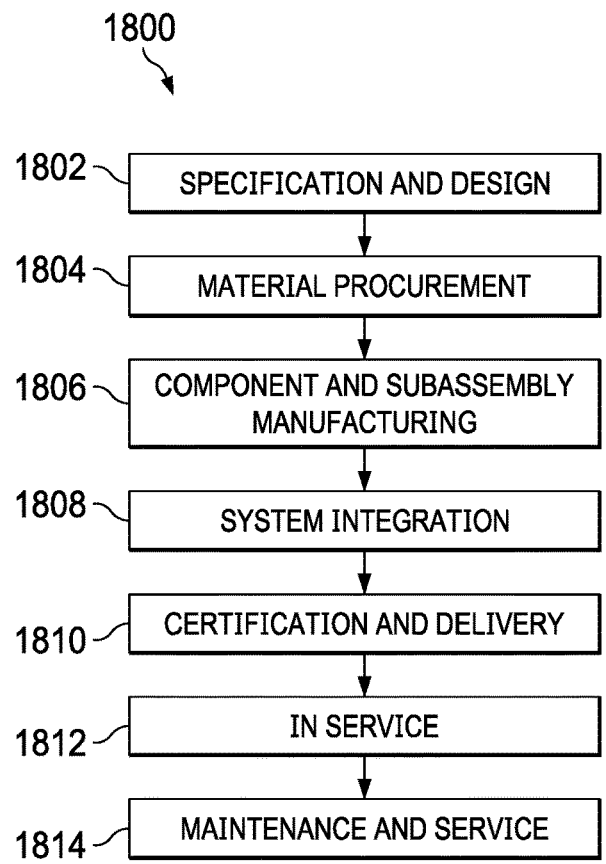
FIG. 18 is an illustration of an aircraft manufacturing and service method in a form of a block diagram in accordance with an illustrative embodiment.
Figure 19:
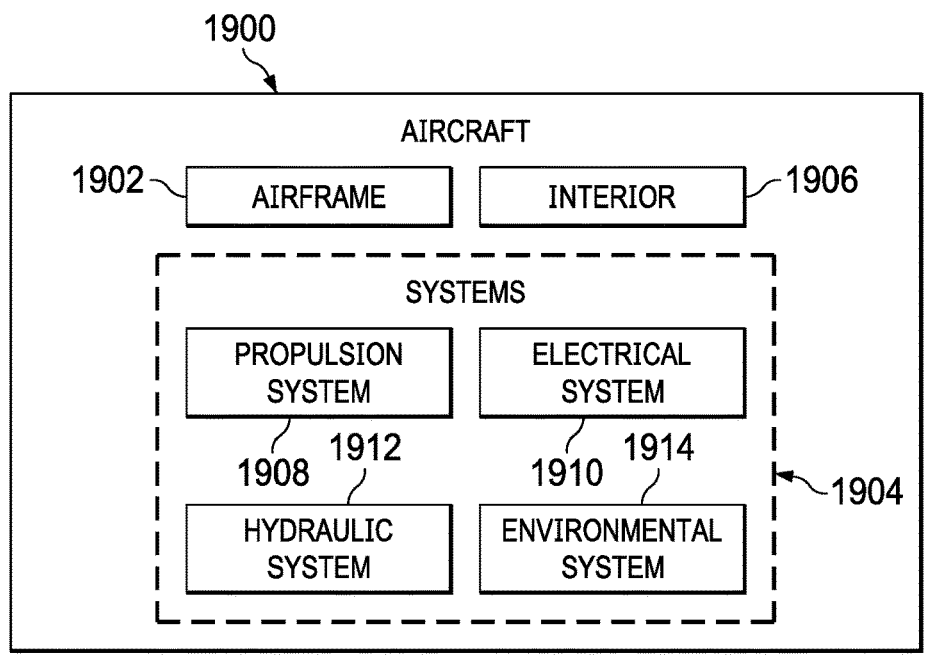
FIG. 19 is an illustration of an aircraft in a form of a block diagram in which an illustrative embodiment may be implemented.

Illustrative embodiments of the present disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During preproduction, aircraft manufacturing and service method 1800 may include specification and design 1802 of aircraft 1900 in FIG. 19 and material procurement 1804.

During production, component and subassembly manufacturing 1806 and system integration 1808 of aircraft 1900 takes place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, or other maintenance and service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 of FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included.

Apparatuses and methods embodied herein may be employed during at least one of the stages of aircraft manufacturing and service method 1800. One or more illustrative embodiments may be manufactured or used during at least one of component and subassembly manufacturing 1806, system integration 1808, in service 1812, or maintenance and service 1814 of FIG. 18.

Coaxial pressure lock assembly 210 can be manufactured in component and subassembly manufacturing 1806 of method 1800. Coaxial pressure lock assembly 210 can be operated during in service 1812 of method 1800. Method 1700 can be performed during in service 1812. Coaxial pressure lock assembly 210 can be a portion of airframe 1902 of aircraft 1900.

The illustrative examples provide a pressure sensing mechanism that is mounted directly onto the latch shaft. The lock mechanism mount on the latch shaft eliminates separate hinges for the pressure panel found in conventional vent doors. The lock mechanism mount on the latch shaft simplifies the interface with the door structure. The lock mechanism mount on the latch shaft directly links the locking feature to the latch shaft for shaft rotation limitation.

More traditional pressure sensing locking mechanisms bridge the functionality of the venting system to a lock system via linkages and tie rods. The illustrative examples have fewer parts than conventional pressure vents. Having fewer parts may improve reliability. Having fewer parts results in a simplicity of activation and incorporation.

The coaxial pressure lock assembly provides a mechanical locking feature on the latch shaft to prevent unlatching the door if an undesirable pressure differential exists that may injure an operator if the door is unlatched. The coaxial pressure lock assembly includes a locking feature (lock pawl) to prevent the latch shaft from rotating to a full unlatched position.

The coaxial pressure lock assembly includes a pressure panel with a seal and balanced springs tunable for pressure differential detection. The coaxial pressure lock assembly includes positive stops for full closed/fully rotated latch shaft end-travel in the form of a restraint feature of a locking pawl assembly. The coaxial pressure lock assembly includes a drive and hold closed feature to position the pressure panel in an opening (cutout) in the aircraft door. The coaxial pressure lock assembly includes an eccentric axis mounting feature to facilitate ice-breaking on the exterior surface of the pressure panel. The coaxial pressure lock assembly includes a full-open travel limit for the pressure door in the form of a slider joint formed with a locking pawl assembly.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A lock assembly that comprises:
a pressure panel that comprises a clevis that comprises two lugs that extend orthogonally from an interior side of the pressure panel, the pressure panel being configured to fill, in a closed position, an opening formed in a door;
a latch shaft that extends through the two lugs, wherein the latch shaft is a portion of a latch assembly configured to control a latched condition of the door;
within a lug of the two lugs, an eccentric mount surrounding a coaxial mount connected to a portion of the latch shaft; and
a spring that connects to an eyelet on a lug of the two lugs and is mounted onto a beam that extends from an interior side of the door; and a locking pawl assembly comprising a second clevis connected to the beam.

2. The lock assembly of claim 1, wherein the spring comprises a pre-determined biasing force selected to bias the pressure panel to an open position at a set pressure differential between an inside of the door and an outside of the door.

3. The lock assembly of claim 2, wherein the eyelet extends out from an edge, located away from the pressure panel, of the lug.

4. The lock assembly of claim 1 further comprising:
the door being an aircraft door; and
the latch shaft configured to rotate around a latch shaft rotational axis.

5. The lock assembly of claim 4 further comprising:
wherein the coaxial mount comprises a first cylindrical channel that surrounds a portion of the latch shaft, and wherein the eccentric mount comprises a second cylindrical channel that surrounds a portion of the coaxial mount.

6. The lock assembly of claim 1 wherein the pressure panel comprises features configured to directly receive the locking pawl assembly configured to restrain a locking sector.

7. The lock assembly of claim 6 wherein:
the features comprise a travel limit feature configured to form a slider joint with the locking pawl assembly and a hold closed feature configured to interact with the locking sector fixed to the latch shaft.

8. The lock assembly of claim 1, further comprising:
the locking pawl assembly connected to and rotatable relative to a portion of the beam that extends parallel to the lugs, wherein the locking pawl assembly forms a shaft rotation restraint passage when the pressure panel is in the closed position.

9. The lock assembly of claim 8, the locking pawl assembly comprises a pin that extends through a travel limit feature in a flange of the pressure panel and forms a slider joint.

10. The lock assembly of claim 8 further comprising:
a locking sector fixed, between the two lugs of the clevis of the pressure panel, to the latch shaft and configured to remain within the shaft rotation restraint passage when the pressure panel is in the closed position.

11. The lock assembly of claim 10, wherein a hold closed feature of the pressure panel and a restraint feature of the locking pawl assembly define the shaft rotation restraint passage with the pressure panel in the closed position.

12. The lock assembly of claim 11, wherein the locking pawl assembly is configured to permit the locking sector to rotate beyond the restraint feature when the pressure panel is in an open position.

13. A method of operating a lock assembly of a door, the method comprising:
mounting a coaxial mount onto a latch shaft;
mounting an eccentric mount around a portion of the coaxial mount;
securing the eccentric mount within a lug in a clevis extending from a pressure panel;
connecting a locking pawl assembly onto the pressure panel and a beam extending from an interior side of the door;
rotating the latch shaft about a latch shaft rotational axis extending through the latch shaft and thereby rotating the pressure panel of the door about a second rotational axis of the eccentric mount and away from an opening formed in door wherein the latch shaft is a portion of a latch assembly for allowing or preventing unlatching of the door; and
the pressure panel rotating the locking pawl assembly about a connection to the beam as the pressure panel rotates and thereby releasing, when the pressure panel is in an open position, a locking sector fixed to the latch shaft for rotating past a restraint feature of the locking pawl assembly and thereby allowing actuation of the latch assembly for unlatching the door.

14. The method of claim 13 further comprising:
pushing the pressure panel towards the opening in the door until the pressure panel is in a closed position with the pressure panel seated in the opening; and
maintaining the locking sector within a shaft rotation restraint passage formed by the pressure panel and the restraint feature of the locking pawl assembly while the pressure panel is in the closed position.

15. The method of claim 14 further comprising:
the door being an aircraft door; and
preventing over-rotation of the pressure panel past the closed position by rotation limit features of the pressure panel contacting rotation limit stops attached to the aircraft door.

16. The method of claim 14 further comprising:
performing an ice-breaking action by rotating the pressure panel about the second rotational axis parallel to and offset from a rotational axis of the latch shaft, wherein the second rotational axis is formed by the eccentric mount encircling a portion of the latch shaft.

17. A lock assembly of a door that comprises an opening, the lock assembly comprising:
an eccentric mount that surrounds a coaxial mount on a portion of a latch shaft;
a locking sector mounted on the latch shaft and configured to control an amount of rotation of the latch shaft;
a pressure panel configured to rotate and fill the opening in the door, wherein the pressure panel comprises:
a clevis that extends from an interior side of the door and comprises two lugs that retain the latch shaft;
a flange that extends from an interior side of the pressure panel and comprises a travel limit feature that connects to a locking pawl assembly also connected to a beam that extends from the interior side of the door, wherein the locking pawl assembly;
comprises a pin that extends through the travel limit feature of the pressure panel; and
forms, with the pressure panel in a closed position, a portion of a shaft rotation restraint passage configured to restrain the locking sector within the shaft rotation restraint passage and prevent a movement of the latch shaft to an unlatched position.

18. The lock assembly of claim 17, wherein the pressure panel further comprises:
rotation limit features configured to prevent a rotation of the pressure panel past the closed position; and
eyelets configured to receive ends of tension springs.

19. The lock assembly of claim 17 further comprising the eccentric mount comprising a second rotational axis parallel to and offset from a latch shaft rotational axis, wherein the pressure panel is configured to rotate about the second rotational axis, and wherein the coaxial mount and the eccentric mount extend into a lug of the two lugs.

20. The lock assembly of claim 19, wherein the coaxial mount comprises a first cylindrical channel that surrounds the portion of the latch shaft, and wherein the eccentric mount comprises a second cylindrical channel that surrounds a portion of the coaxial mount.

\* \* \* \* \*